United States Patent
Derry et al.

(10) Patent No.: US 7,922,137 B2
(45) Date of Patent: Apr. 12, 2011

(54) LAPTOP HOLDER FOR EXTENSION ARM

(75) Inventors: Bradley A. Derry, Easton, PA (US);
David VanDuzer, Slatington, PA (US);
Odd N. Oddsen, Jr., Easton, PA (US)

(73) Assignee: Innovative Office Products, Inc.,
Easton, PA (US)

( * ) Notice: Subject to any disclaimer, the term of this patent is extended or adjusted under 35 U.S.C. 154(b) by 483 days.

(21) Appl. No.: 11/508,367

(22) Filed: Aug. 23, 2006

(65) Prior Publication Data
US 2008/0029663 A1 Feb. 7, 2008

Related U.S. Application Data

(63) Continuation-in-part of application No. 29/264,184, filed on Aug. 4, 2006, now Pat. No. Des. 558,772, and a continuation-in-part of application No. 29/264,185, filed on Aug. 4, 2006, now Pat. No. Des. 558,773.

(51) Int. Cl.
*E04G 3/00* (2006.01)

(52) U.S. Cl. ............... 248/274.1; 248/276.1; 248/278.1; 248/281.11; 248/228.6; 248/230.6; 248/231.71; 248/441.1; 248/442.2; 248/917; 248/919; 248/178.1

(58) Field of Classification Search ............... 248/274.1, 248/276.1, 278.1, 281.11, 228.6, 230.6, 231.71, 248/442.2, 917, 919, 441.1, 178.1, 292.12, 248/277.1, 921, 924
See application file for complete search history.

(56) References Cited

U.S. PATENT DOCUMENTS

| | | | | | |
|---|---|---|---|---|---|
| 759,926 | A | * | 5/1904 | Smith | 248/278.1 |
| 794,434 | A | * | 7/1905 | Valiquet | 403/59 |
| 862,909 | A | * | 8/1907 | Heiman | 248/278.1 |
| 999,283 | A | * | 8/1911 | White | 248/282.1 |
| 1,239,136 | A | * | 9/1917 | Stone | 248/673 |
| 2,003,844 | A | * | 6/1935 | Tintner | 403/97 |

(Continued)

FOREIGN PATENT DOCUMENTS
WO   WO 2006130324 A2 * 12/2006

OTHER PUBLICATIONS

Model 7011 Laptop Arm Installation Instructions, Innovative Office Products, Inc., © 2004.

(Continued)

*Primary Examiner* — J. Allen Shriver, II
*Assistant Examiner* — Nkeisha J Smith
(74) *Attorney, Agent, or Firm* — Design IP

(57) ABSTRACT

The present invention provides a device for holding a laptop computer or other portable devices. The laptop is placed on a support having a generally planar surface. A pair of adjustable arm members is pivotally connected to the support. The user may adjust one or both of the arm members to accommodate portable devices of different sizes. Clips or other connectors are used to secure the laptop to the holding device. The clips connect to the arm members and to the support. The clips may have one or more components, and may be configured to slide along the arm members and the support. The support may include a number of projections that can be arranged in an X-shaped configuration. A release plate or other connector couples the holding device to an extension assembly. The release plate provides a quick release from a tilting device of the extension assembly.

22 Claims, 25 Drawing Sheets

U.S. PATENT DOCUMENTS

| | | | | |
|---|---|---|---|---|
| 2,046,134 | A * | 6/1936 | Ryang | 248/461 |
| 2,193,647 | A * | 3/1940 | Rush et al. | 108/49 |
| 2,913,830 | A | 11/1959 | Schroter | |
| 3,140,558 | A * | 7/1964 | Cassidy | 248/449 |
| 3,451,668 | A | 6/1969 | Robinson | |
| 4,032,232 | A | 6/1977 | Perthes | |
| 4,323,214 | A * | 4/1982 | DeLuca | 248/452 |
| 4,436,271 | A * | 3/1984 | Manso | 248/460 |
| 4,592,526 | A * | 6/1986 | Kobelt | 248/284.1 |
| 4,783,036 | A * | 11/1988 | Vossoughi | 248/281.11 |
| 4,913,390 | A | 4/1990 | Berke | |
| 5,029,796 | A | 7/1991 | Schoenig | |
| 5,330,147 | A | 7/1994 | Volcheff et al. | |
| 5,362,025 | A * | 11/1994 | Trom et al. | 248/670 |
| 5,367,815 | A * | 11/1994 | Liou | 43/21.2 |
| 5,372,348 | A * | 12/1994 | Cheng | 248/447.2 |
| 5,433,415 | A * | 7/1995 | Samson et al. | 248/448 |
| 5,470,041 | A | 11/1995 | Cucinotta | |
| 5,513,829 | A * | 5/1996 | Hodges | 248/670 |
| 5,547,305 | A * | 8/1996 | Treche | 403/97 |
| 5,551,660 | A * | 9/1996 | Leduchowski | 248/276.1 |
| 5,607,135 | A | 3/1997 | Yamada et al. | |
| 5,623,869 | A | 4/1997 | Moss et al. | |
| 5,673,628 | A | 10/1997 | Boos | |
| D390,209 | S | 2/1998 | Dials et al. | |
| 5,839,713 | A | 11/1998 | Wright | |
| 5,964,439 | A * | 10/1999 | Johnson | 248/278.1 |
| 5,979,940 | A * | 11/1999 | Araghi | 281/45 |
| 6,068,299 | A * | 5/2000 | Peltzer | 281/45 |
| 6,076,785 | A | 6/2000 | Oddsen, Jr. | |
| 6,202,973 | B1 * | 3/2001 | Navarin et al. | 248/444 |
| 6,209,838 | B1 | 4/2001 | Anderson et al. | |
| 6,244,553 | B1 * | 6/2001 | Wang | 248/278.1 |
| 6,305,653 | B1 * | 10/2001 | Oldham et al. | 248/177.1 |
| 6,366,458 | B1 | 4/2002 | Yoshida et al. | |
| 6,409,134 | B1 | 6/2002 | Oddsen, Jr. | |
| 6,478,274 | B1 | 11/2002 | Oddsen, Jr. | |
| 6,491,268 | B1 * | 12/2002 | Channer et al. | 248/176.1 |
| 6,496,360 | B1 | 12/2002 | Cordes et al. | |
| 6,505,988 | B1 | 1/2003 | Oddsen, Jr. | |
| 6,527,241 | B1 | 3/2003 | Lord | |
| D473,562 | S | 4/2003 | Russell | |
| D473,563 | S | 4/2003 | Russell | |
| D475,057 | S | 5/2003 | Lord | |
| 6,585,212 | B2 | 7/2003 | Carnevali | |
| 6,604,720 | B1 * | 8/2003 | Wilson | 248/177.1 |
| 6,619,872 | B2 * | 9/2003 | Crorey et al. | 403/97 |
| 6,695,270 | B1 * | 2/2004 | Smed | 248/274.1 |
| 6,733,043 | B2 * | 5/2004 | Silverstein | 281/45 |
| 6,758,454 | B2 * | 7/2004 | Smed | 248/314 |
| D494,183 | S * | 8/2004 | Wills et al. | D14/452 |
| D498,611 | S | 11/2004 | Lin et al. | |
| D511,522 | S | 11/2005 | Toltzman et al. | |
| 7,035,100 | B2 | 4/2006 | Lord | |
| 7,121,214 | B1 | 10/2006 | Toltzman et al. | |
| 7,152,836 | B2 * | 12/2006 | Pfister et al. | 248/292.14 |
| 7,243,892 | B2 * | 7/2007 | Pfister | 248/371 |
| 7,261,265 | B2 * | 8/2007 | Burns | 248/276.1 |
| D558,772 | S * | 1/2008 | Derry et al. | D14/447 |
| D558,773 | S * | 1/2008 | Derry et al. | D14/447 |
| 2002/0011544 | A1 * | 1/2002 | Bosson | 248/121 |
| 2004/0007651 | A1 | 1/2004 | Williams et al. | |
| 2004/0011932 | A1 * | 1/2004 | Duff | 248/157 |
| 2004/0014349 | A1 * | 1/2004 | Oddsen, Jr. | 439/345 |
| 2004/0026590 | A1 | 2/2004 | Lin | |
| 2005/0006542 | A1 * | 1/2005 | Henning et al. | 248/274.1 |
| 2005/0230585 | A1 | 10/2005 | Hung | 248/278.1 |
| 2006/0102818 | A1 * | 5/2006 | Carnevali | 248/278.1 |
| 2006/0181637 | A1 * | 8/2006 | Oddsen et al. | 348/373 |
| 2006/0186301 | A1 * | 8/2006 | Dozier et al. | 248/371 |
| 2006/0261227 | A1 * | 11/2006 | Petrick et al. | 248/276.1 |
| 2006/0266903 | A1 * | 11/2006 | Oddsen et al. | 248/274.1 |
| 2006/0266909 | A1 * | 11/2006 | Oddsen et al. | 248/371 |

OTHER PUBLICATIONS 7011-8252-Laptop Mount on Height-Adjustable Arm-With Oversize Notebook Tray, http://www.1cdarms.com/printable_product_detail.php?model=7011-8252&cat=laptop%20mounts, retrieved from the Internet on May 12, 2006.

7011-8129-Laptop Mount on Height-Adjustable Arm, http://www.1cdarms.com/printable_product_detail.php?model=7011-8129&cat=laptop%20mounts, retrieved from the Internet on May 12, 2006.

U.S. Appl. No. 11/141,348, filed Mar. 31, 2005, entitled "Angled Mini Arm Having A Clevis Assembly".

U.S. Appl. No. 11/141,425, filed Mar. 31, 2005, entitled "Tapered Mini Arm Having An Anti-Loosening Mechanism".

* cited by examiner

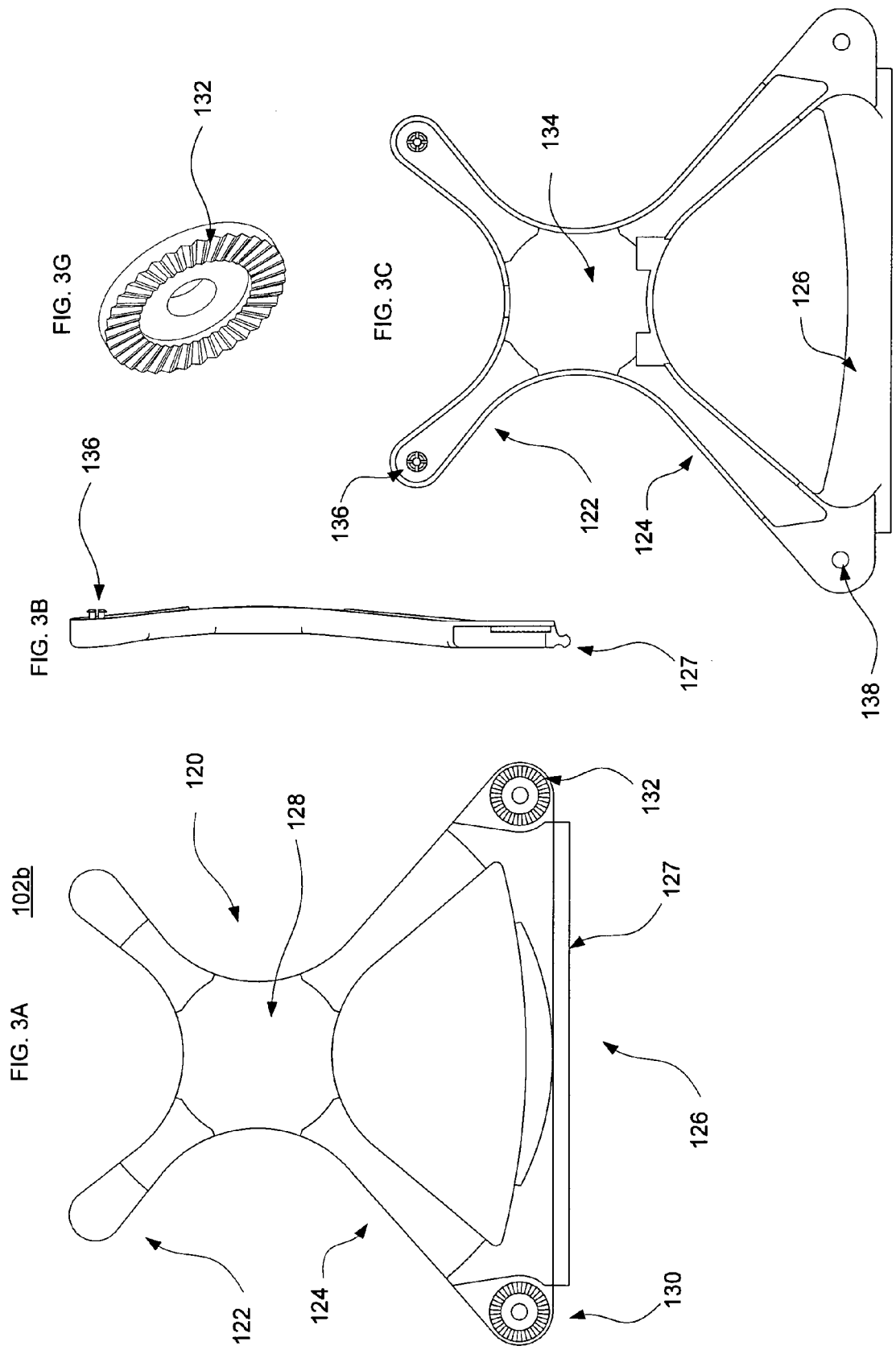

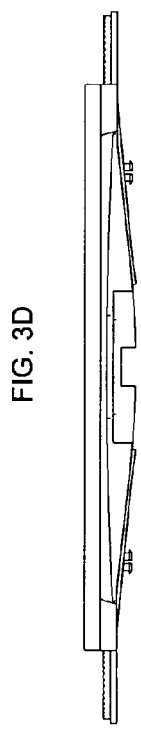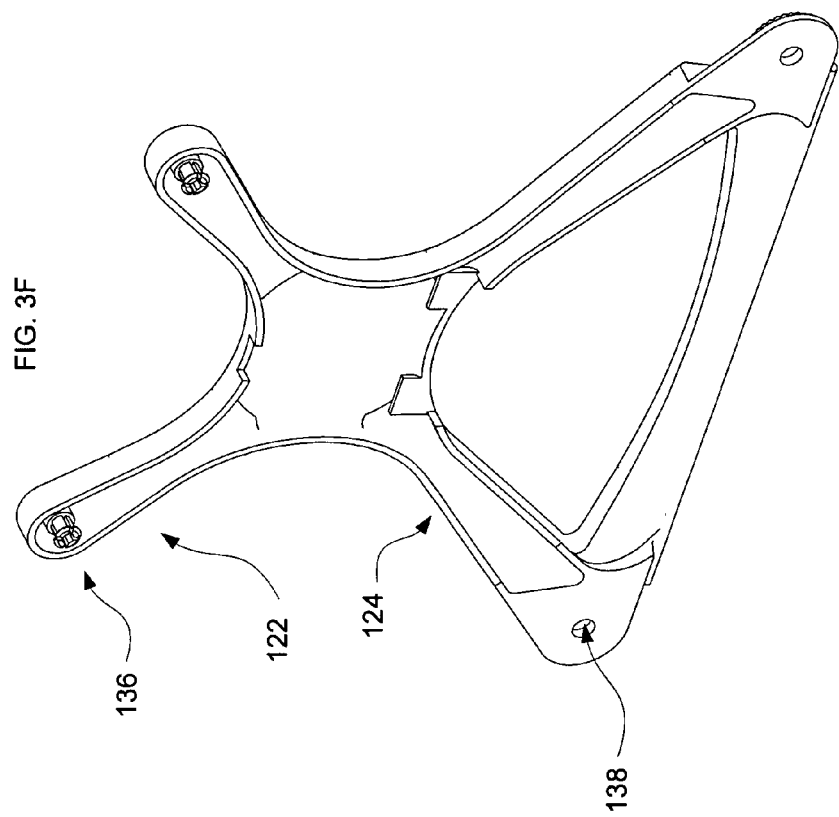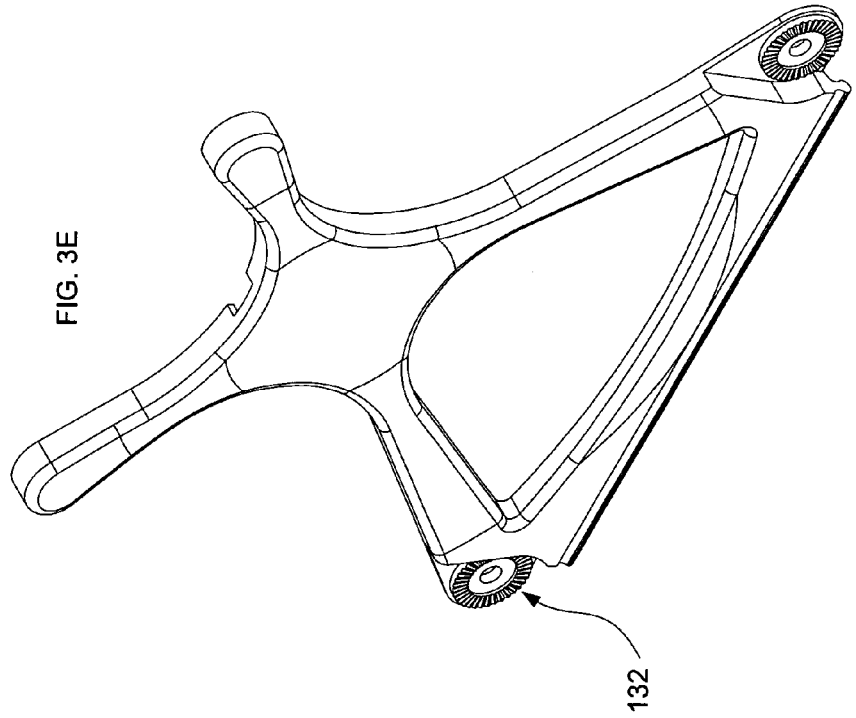

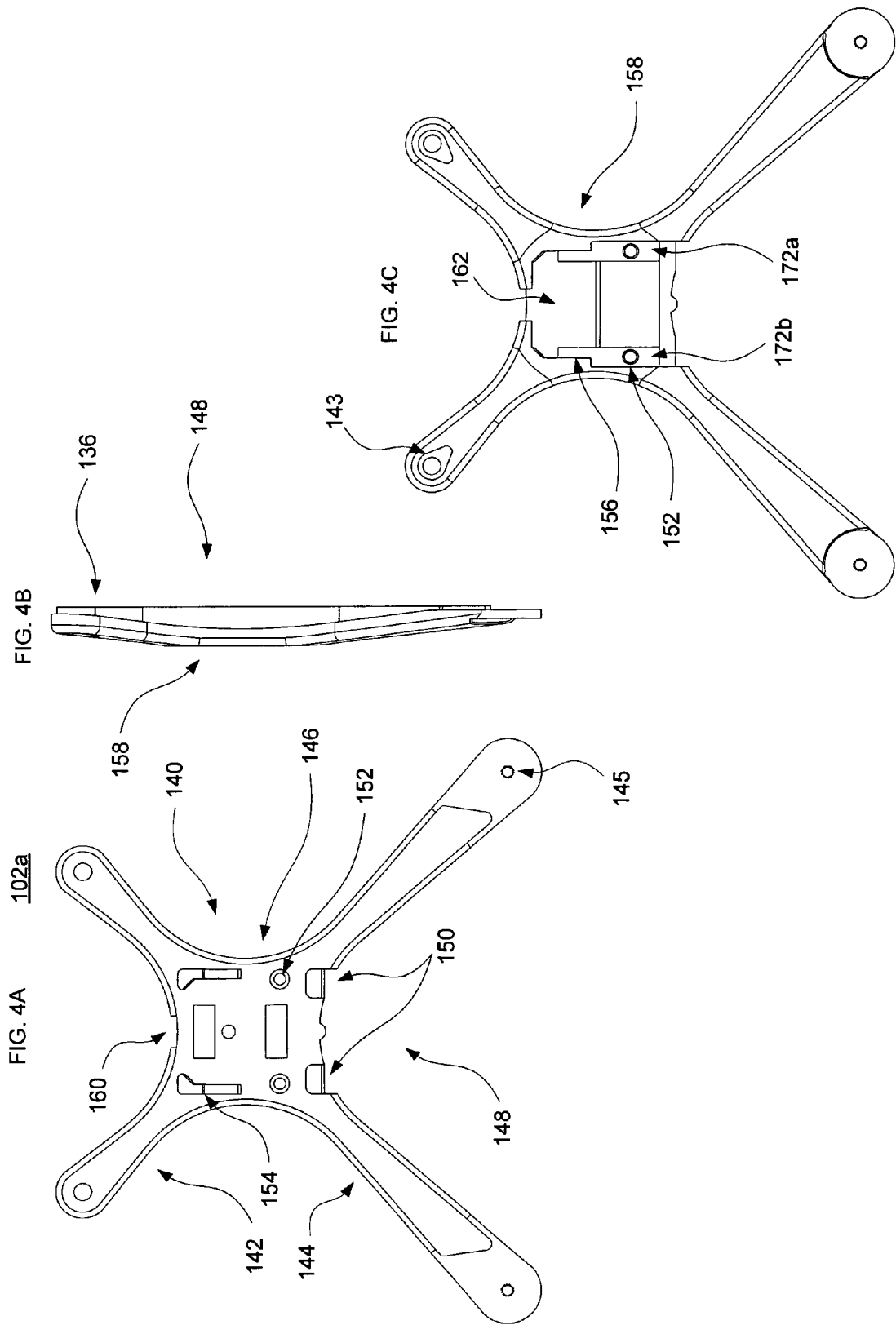

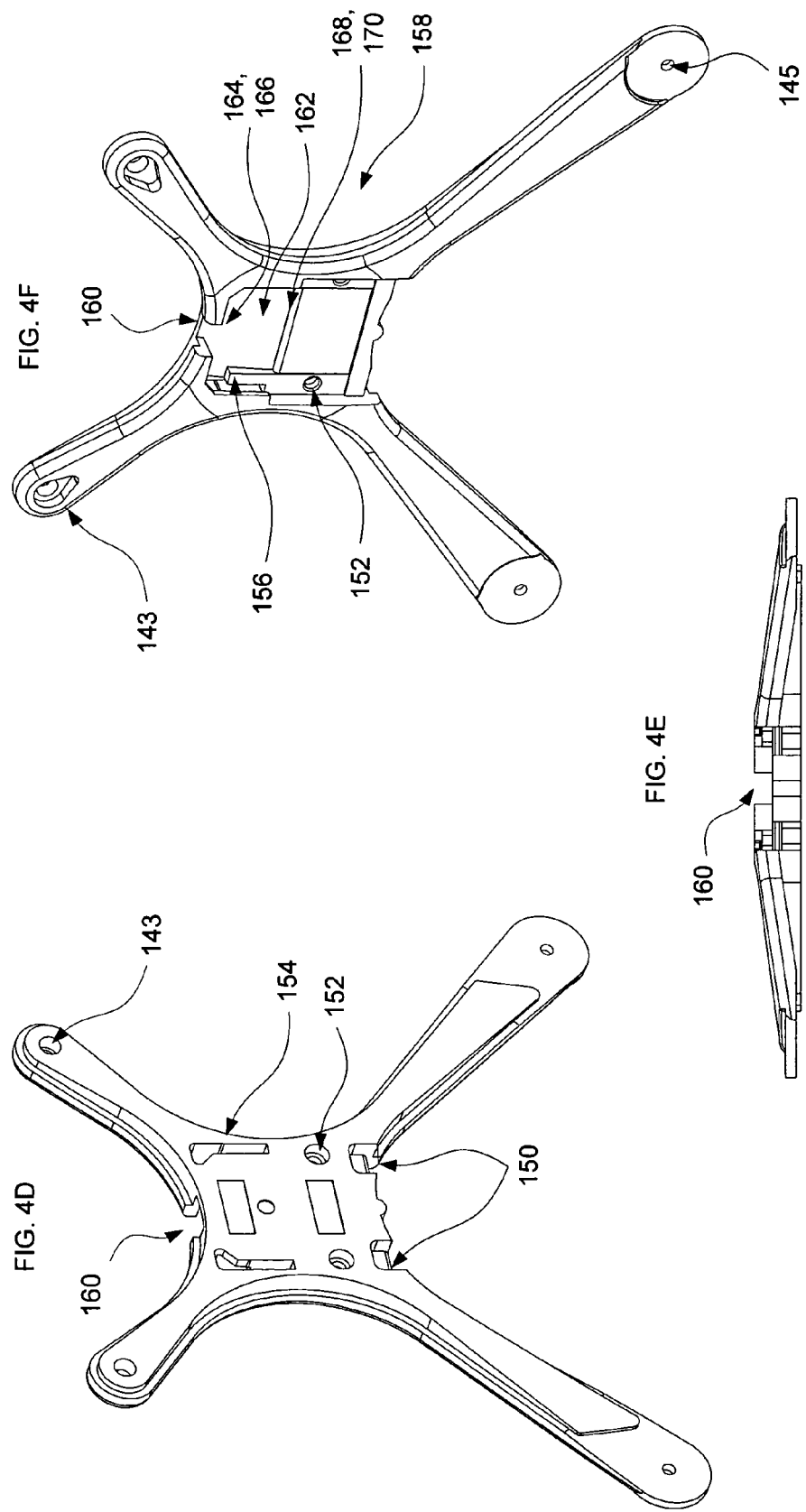

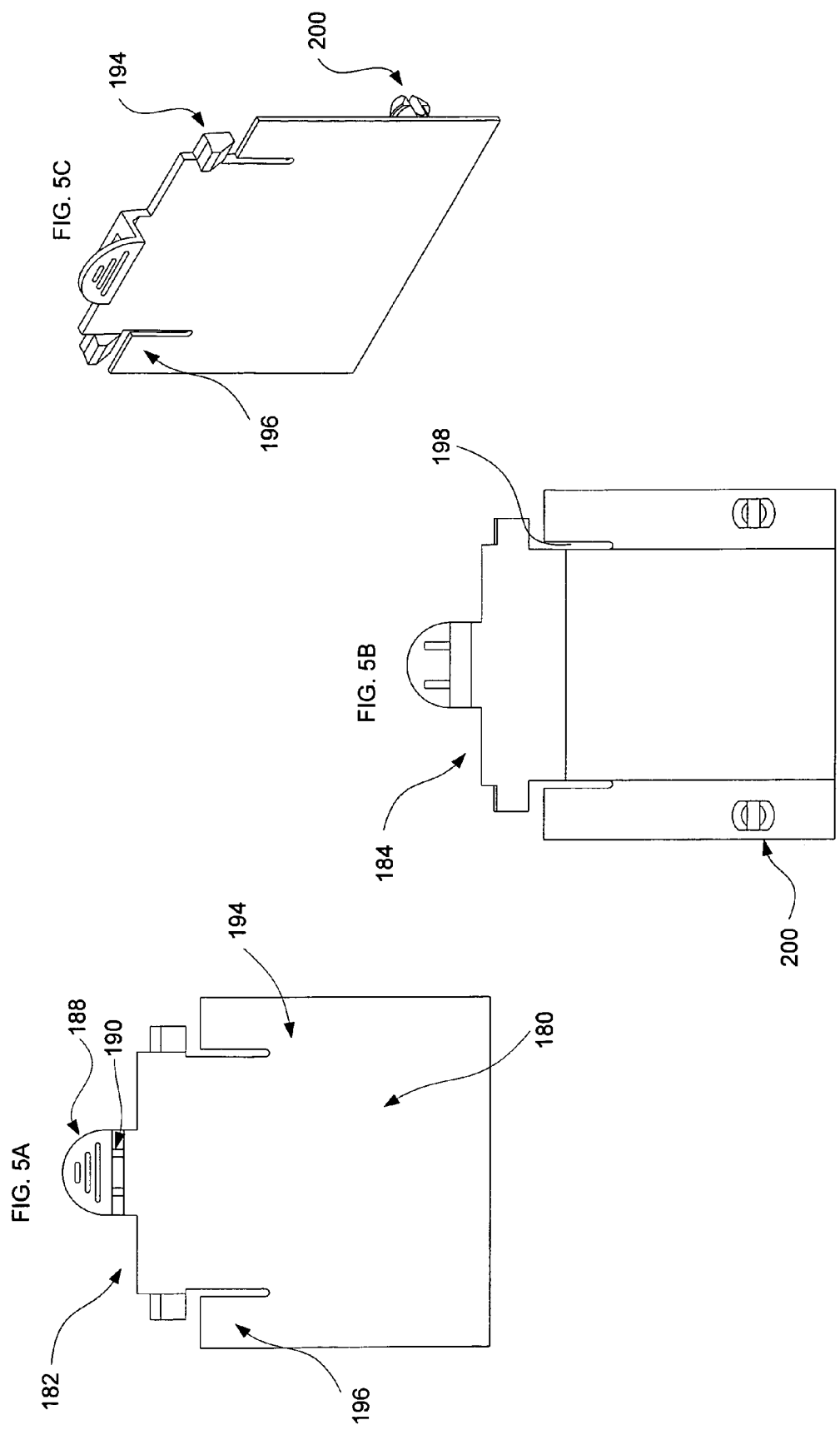

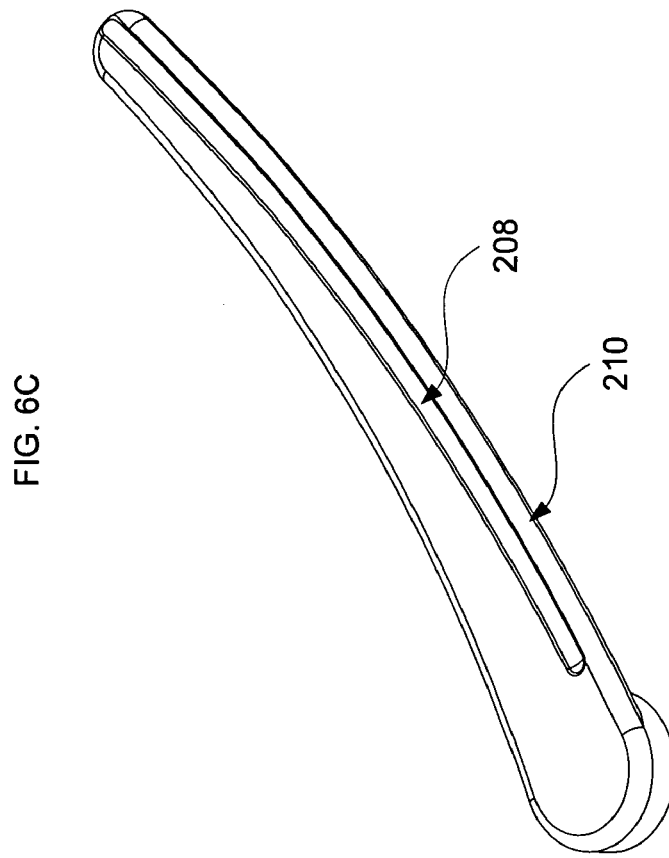
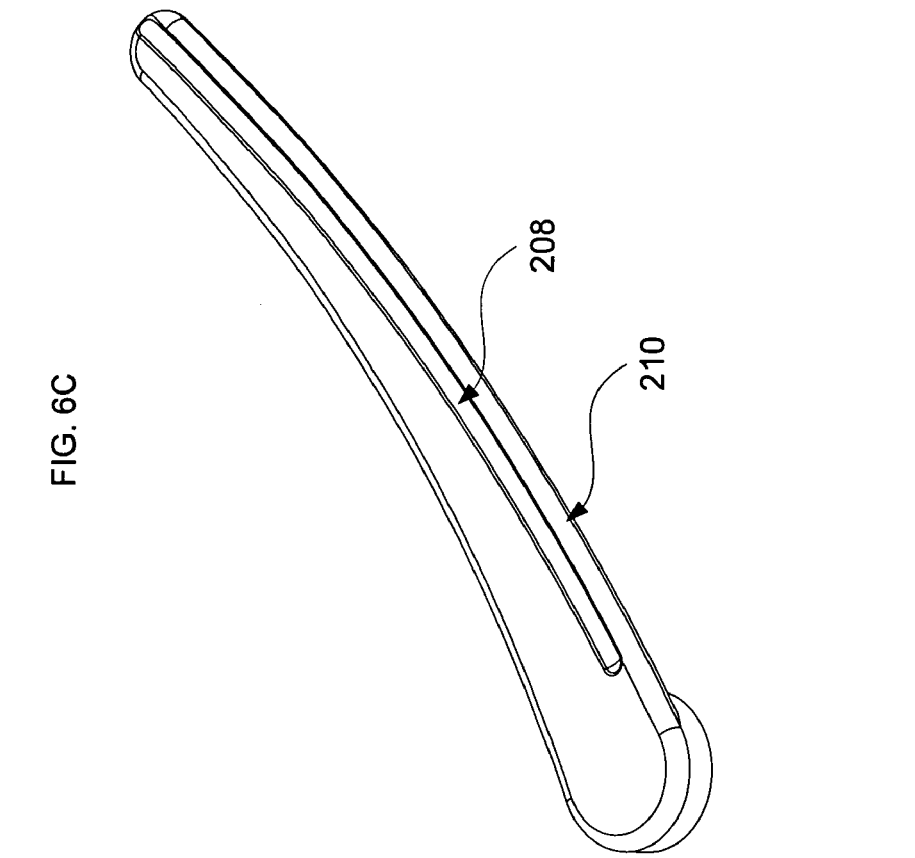
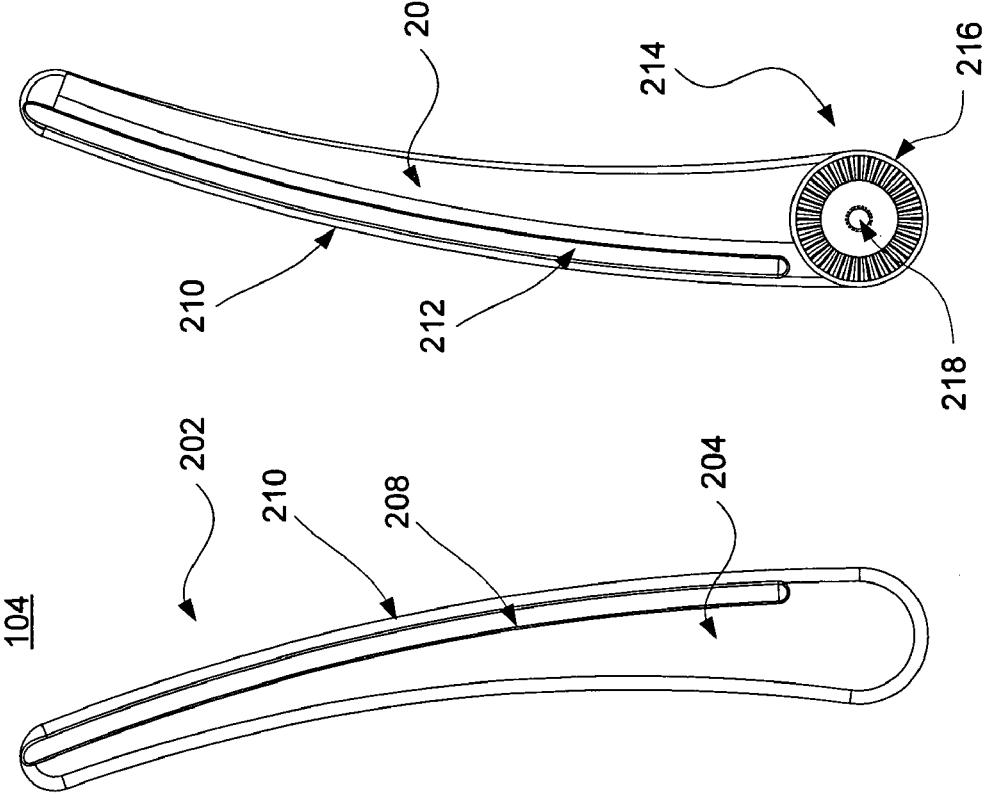

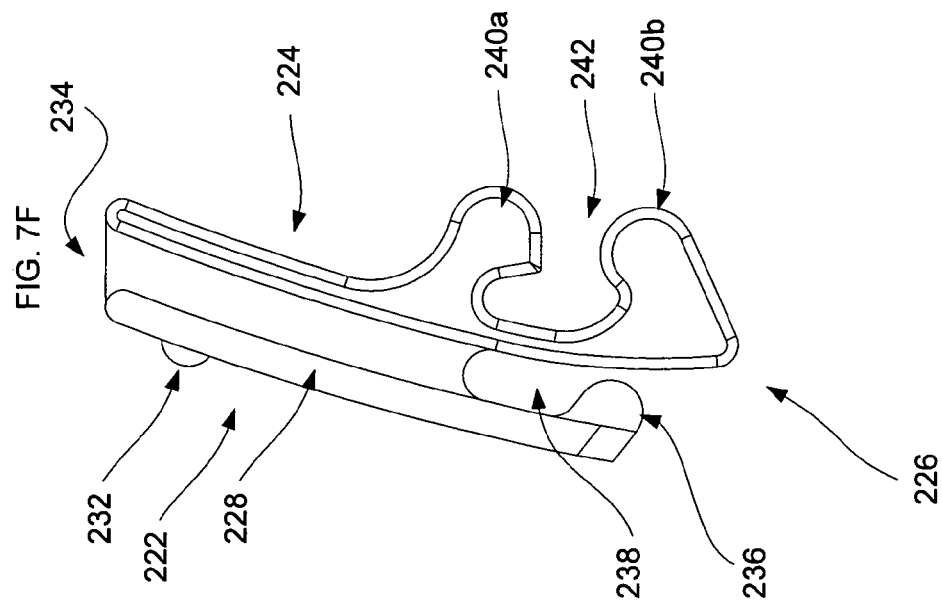
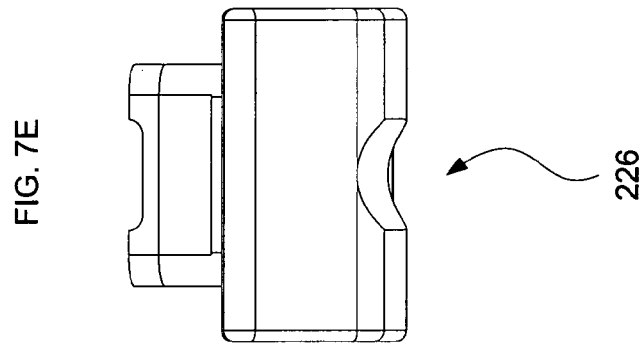
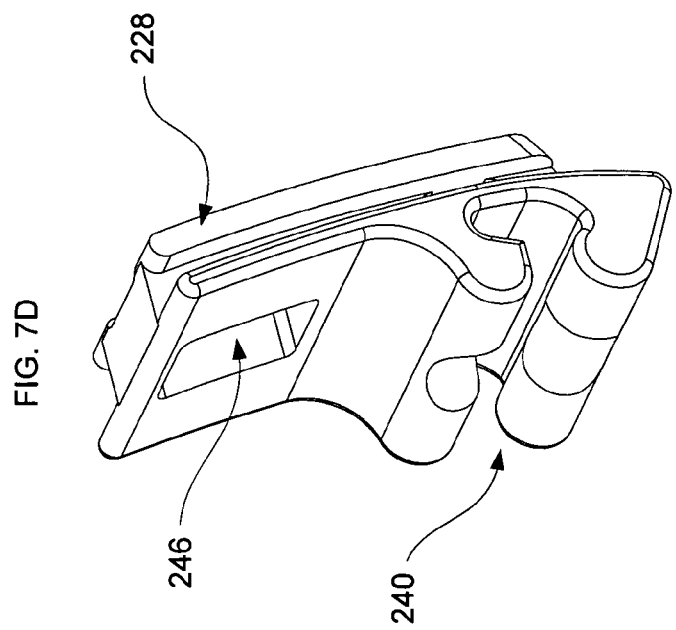

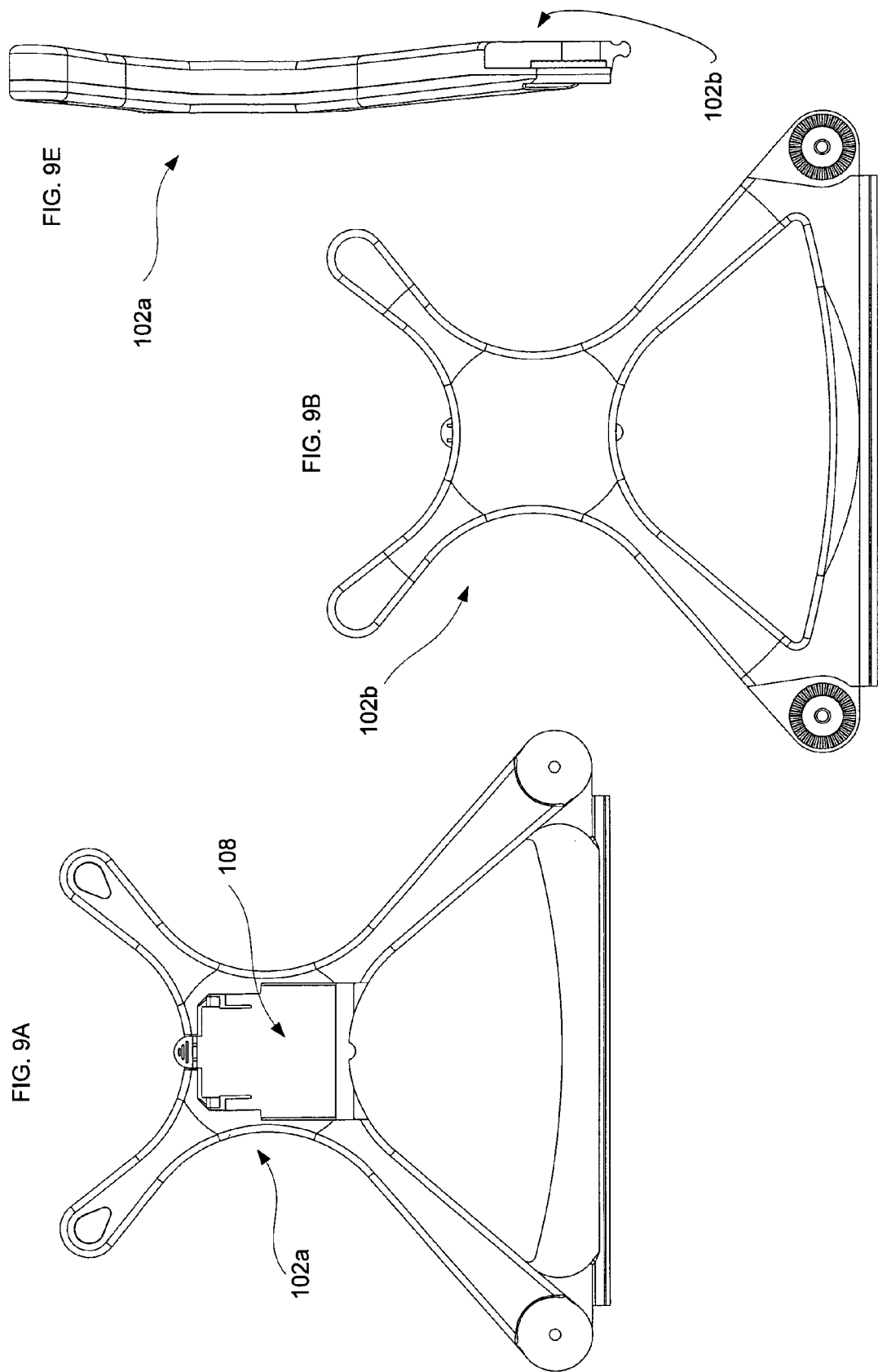

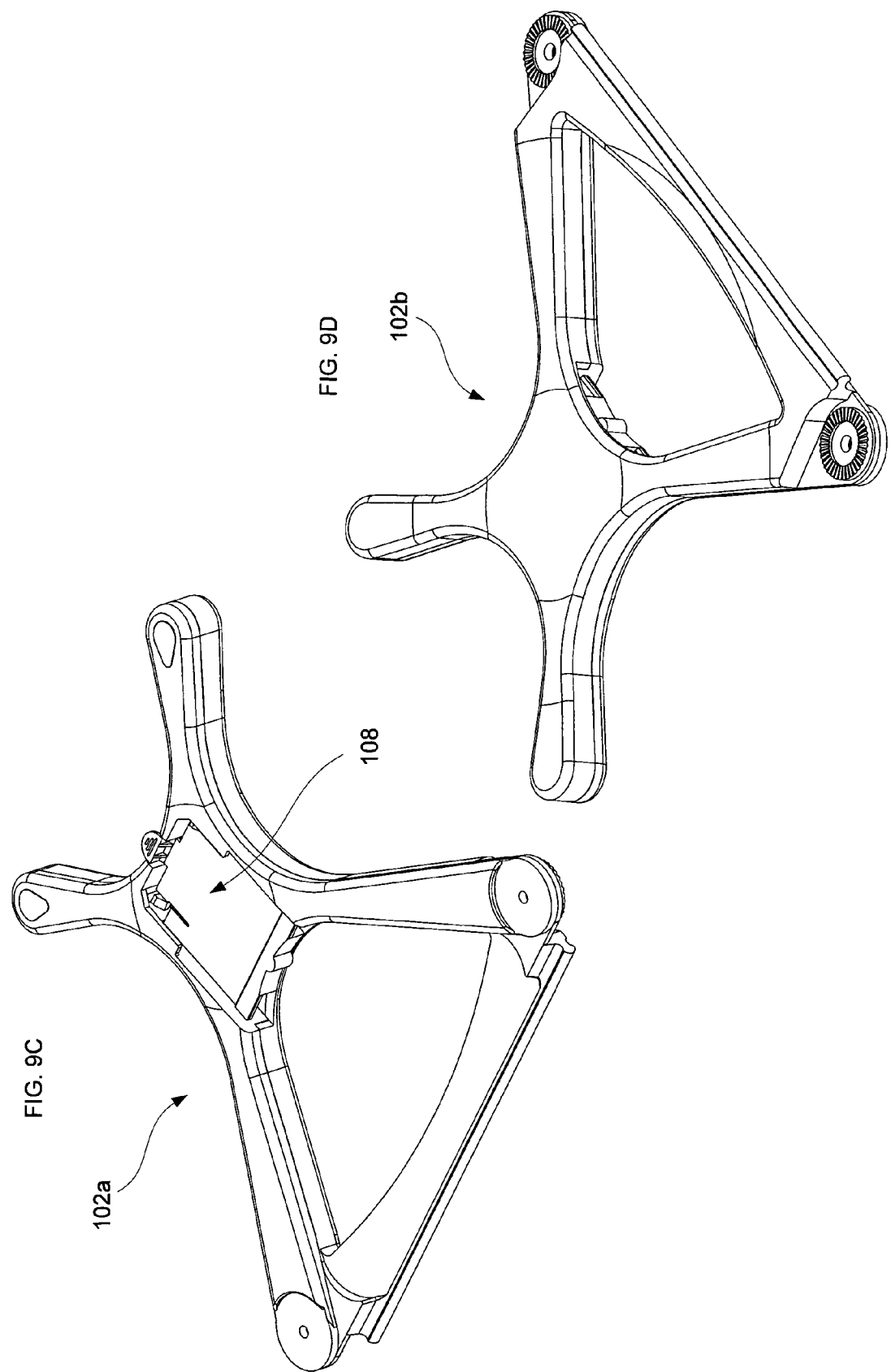

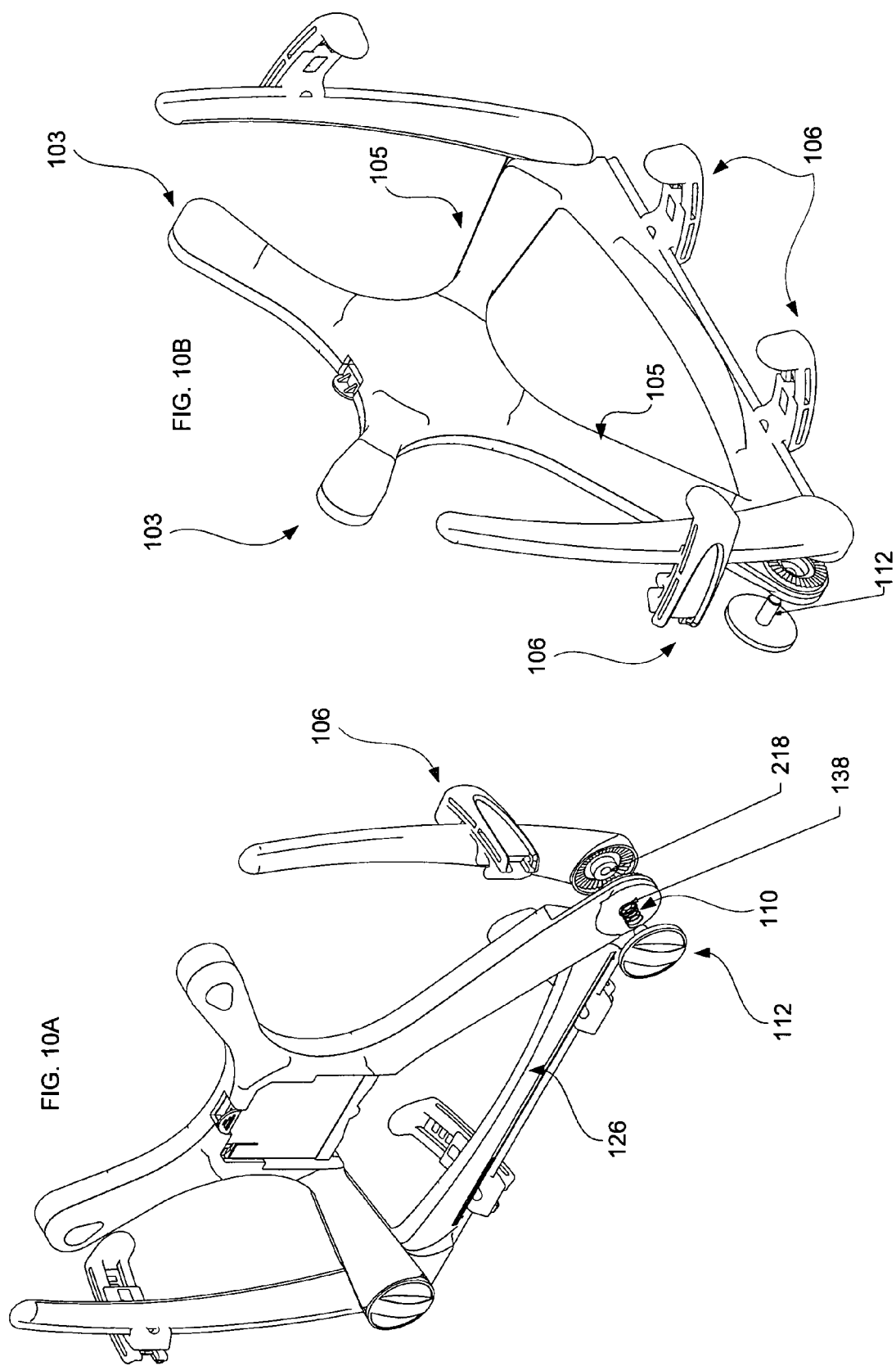

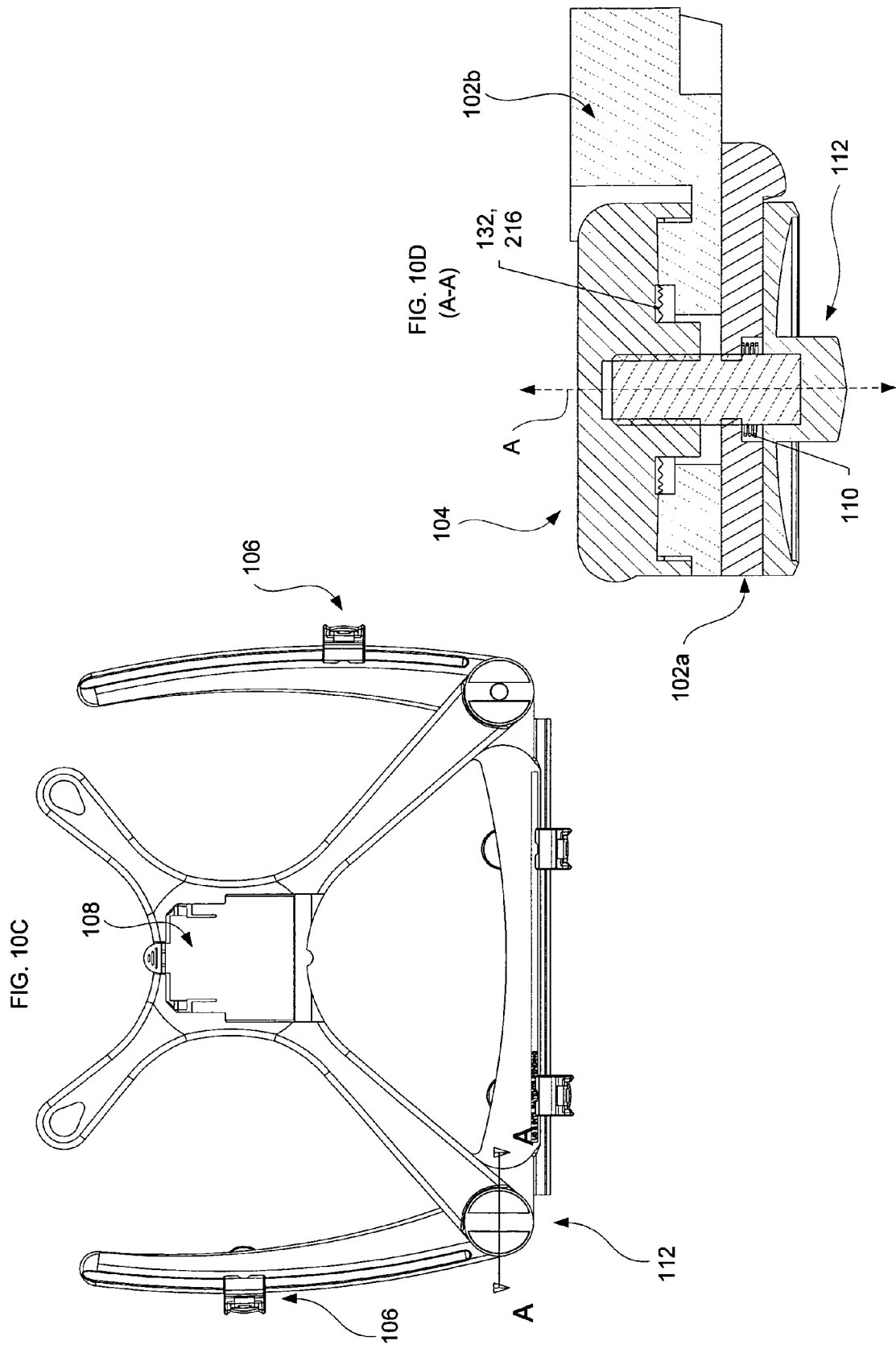

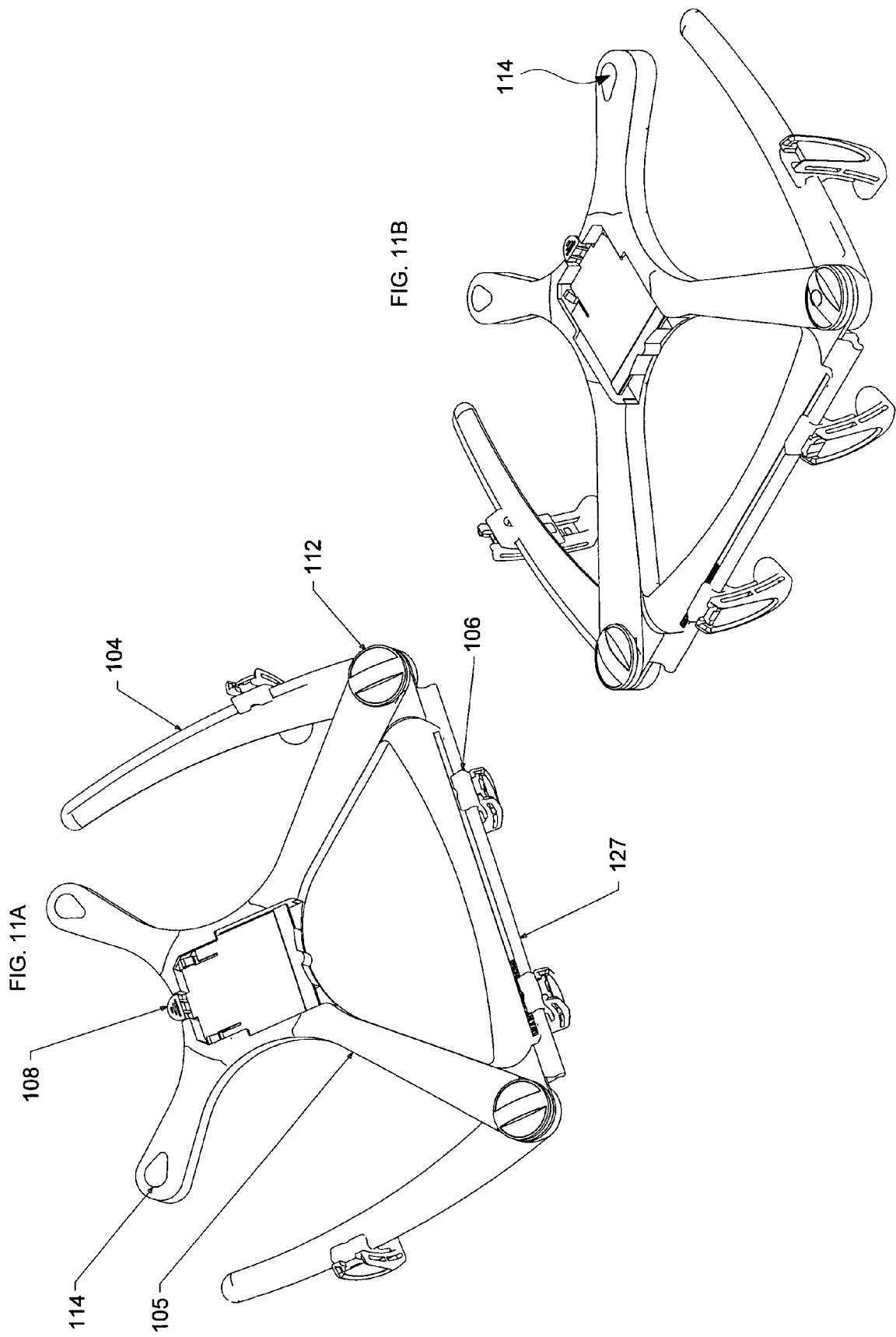

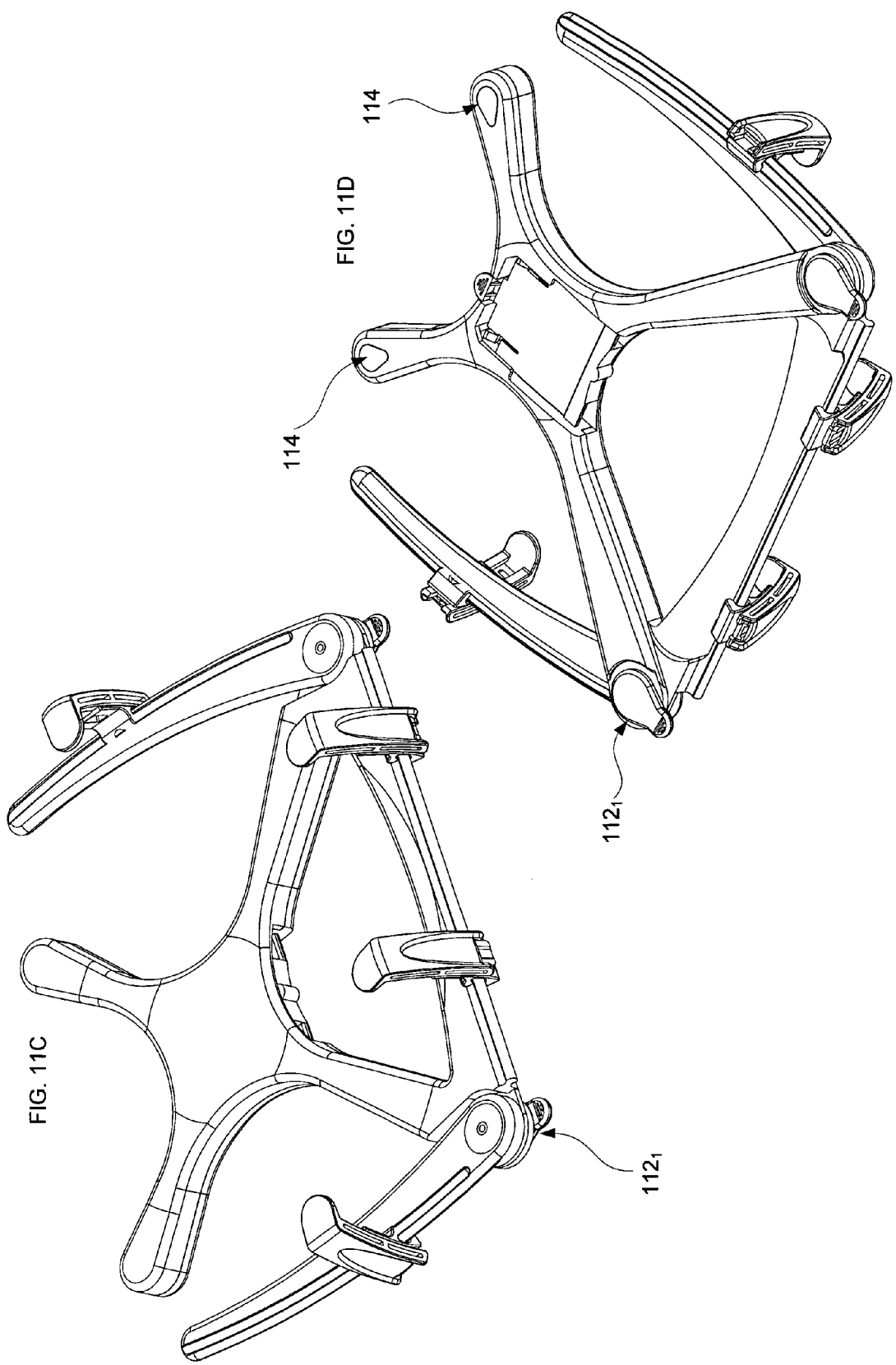

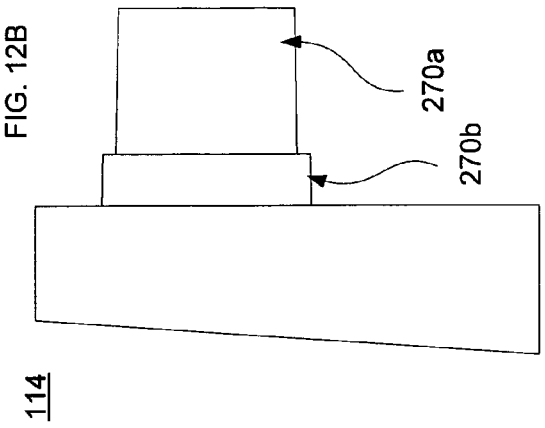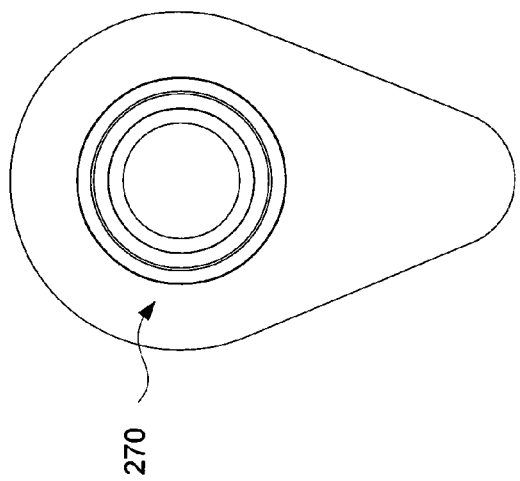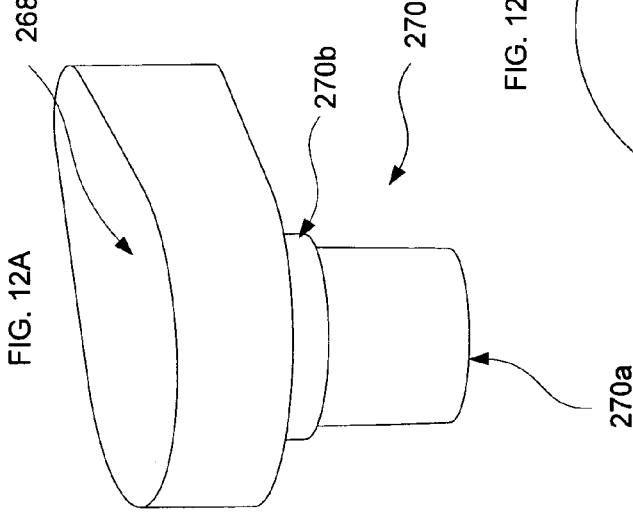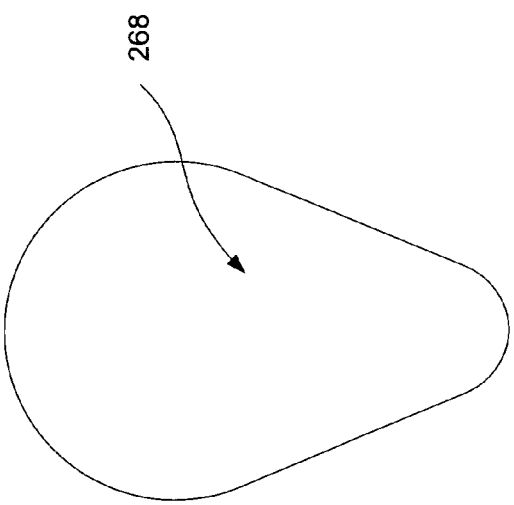

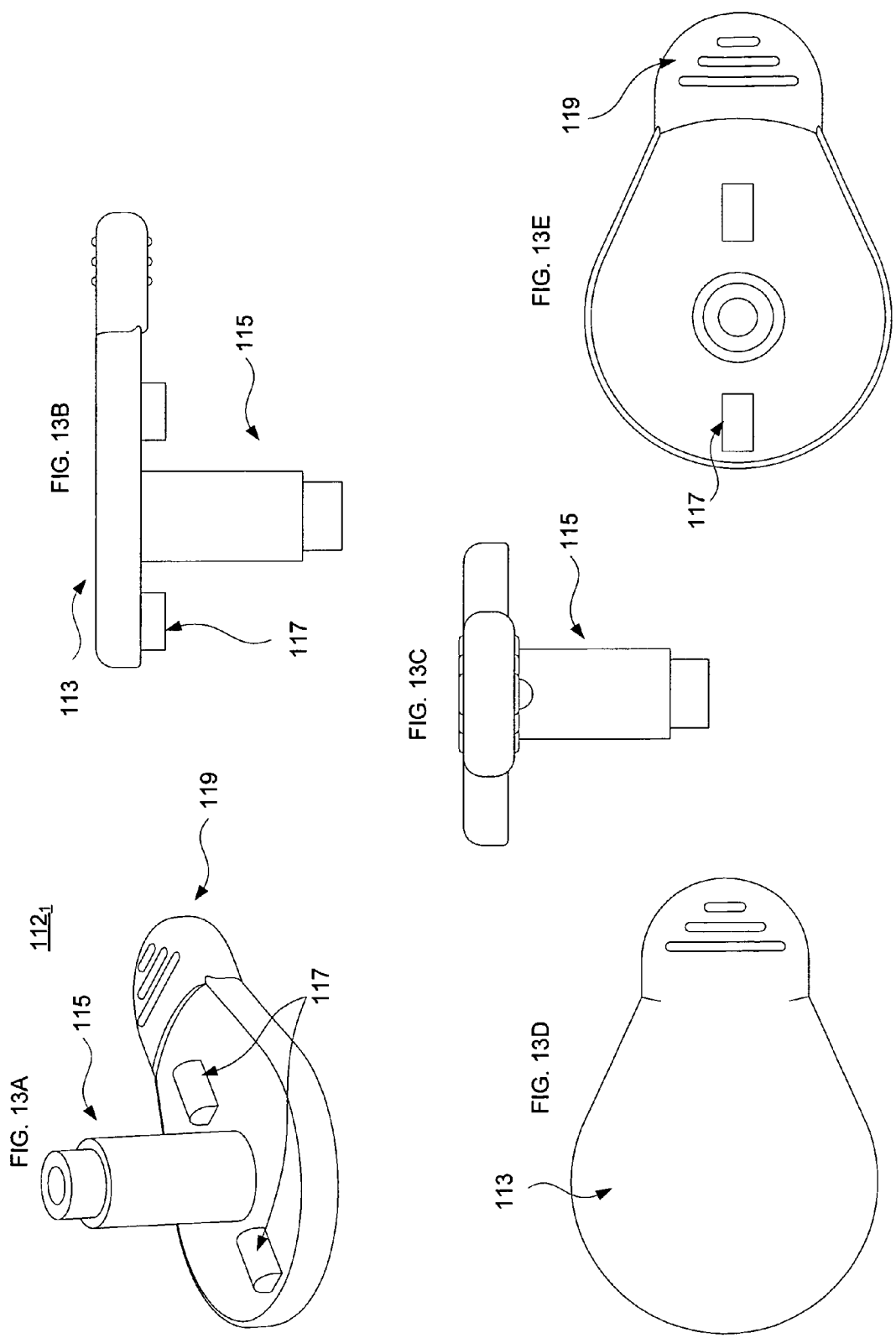

LAPTOP HOLDER FOR EXTENSION ARM

CROSS REFERENCE TO RELATED APPLICATIONS

The present application is a continuation-in-part of U.S. Design patent application Ser. No. 29/264,184, entitled LAPTOP HOLDER, filed Aug. 4, 2006 and U.S. Design patent application Ser. No. 29/264,185, entitled LAPTOP HOLDER, filed Aug. 4, 2006, the entire disclosures of which are hereby expressly incorporated by reference herein.

BACKGROUND OF THE INVENTION

The present invention relates to a device for use in supporting and displaying electronic devices. More particularly, the present invention is particularly adapted for use as a support platform for use with laptop computers and other portable computing devices.

Laptop computers and similar portable devices are often used in home and office environments, and may be placed on a desk as a stand alone device or in conjunction with a docking station. Unfortunately, the convenience in size and portability may not be matched by proper ergonomics in the placement of such devices. For instance, the keyboard should be positioned a comfortable distance from the user to avoid wrist, back and/or neck strain, but the display should be positioned at an appropriate distance to avoid eye strain. These requirements may conflict, causing the user to choose between undesirable alternatives.

In order to address these conditions, it is possible for a user to connect an external monitor, an external keyboard and/or an external mouse to the laptop computer. The monitor, keyboard and mouse may be separately mounted and adjusted to achieve desired ergonomic effects.

For example, one solution is to place the keyboard and/or mouse in a sliding drawer which can be closed when the keyboard or mouse is not in use. In another solution, a monitor stand can be used to elevate the display over other equipment on a desk. While this may free up space on the workspace, it often places the equipment in undesirable locations. For example, access to the keyboard and mouse may require repeated opening and closing of the drawer.

A further solution employs a mechanical extension arm to support the monitor or the keyboard. One such monitor extension arm is shown and described in U.S. Pat. No. 6,478,274, entitled "Arm Apparatus for Mounting Electronic Devices," which is fully incorporated by reference herein. Another type of monitor extension arm is shown and described in U.S. Pat. No. 6,409,134, entitled "Arm Apparatus for Mounting Electronic Devices with Cable Management System," which is fully incorporated by reference herein. An example of a keyboard extension arm/support mechanism is shown and described in U.S. Pat. No. 6,076,785, entitled "Ergonomic Sit/Stand Keyboard Support Mechanism," which is fully incorporated by reference herein.

However, the use of a separate monitor, mouse and/or keyboard leads to multiple devices that can take up valuable real estate on, in, or over the user's workspace. Furthermore, the cost of the separate components may be prohibitive, especially for space-saving monitors such as flat panel displays, wireless keyboards and wireless mice.

Therefore, it is desirable to provide another solution to ergonomic and other problems. For instance, it is possible to provide a docking station or support device for use with the laptop computer itself. The support device may take the form of an extension arm adapted for handling laptop computers.

An example of an extension arm for use with laptop computers is shown and described in U.S. Patent Publication No. 2004/0007651, entitled "Universal Support for Electronic Devices," which is fully incorporated by reference herein.

While such laptop extension arms are suitable for supporting laptop computers, a need exists for enhanced devices to securely and adjustably support portable electronic devices in an ergonomic matter.

SUMMARY OF THE INVENTION

In accordance with an embodiment of the present invention, an apparatus for holding a portable electronic user device is provided. The apparatus comprises a support member, a pair of opposing arm members, and a plurality of connectors. The support member includes a body and a plurality of projections extending from the body in a generally planar configuration to provide a support surface for the user device. The opposing arm members are pivotally attached to a respective pair of the projections. The connectors are operable to secure the user device to the apparatus. A first one of the connectors is attached to the support member, a second one of the connectors is attached to a first one the pair of arm members, and a third one of the connectors is attached to a second one of the pair of arm members.

In one alternative, the support member further includes a supplemental support disposed along the generally planar configuration. Here, a first pair of the plurality of projections comprises a first pair of extensions. The supplemental support connects the first pair of extensions together. The plurality of projections preferably further comprises a second pair of extensions, and the first and second pairs of extensions are arranged in an X-shaped configuration. In this case, the first pair of extensions desirably each has a first length and the second pair of extensions desirably each has a second length. The first length is longer than the first length.

In another alternative, the plurality of connectors includes at least one clip member. Here, the support preferably includes a clip receiving portion therealong for slideably receiving the at least one clip member. In this case, the pair of opposing arm members may each include a clip receiving portion therealong. The at least one clip member preferably comprises a plurality of clip members. A first one of the clip members is slideably connected to the clip receiving portion of the support, a second one of the clip members is slideably connected to the clip receiving portion of a first one of the pair of opposing arm members, and a third one of the clip members is slideably connected to the clip receiving portion of a second one of the pair of opposing arm members.

In a further alternative, the support member comprises a first support member and a second support member attached to the first support member. The first support member has the support surface for receiving the user device, and the second support member has an adapter section for coupling the apparatus to an extension arm assembly. The adapter section preferably includes means for releasably coupling the apparatus from the extension arm assembly.

In another alternative, the pair of opposing arm members each includes a first series of locking teeth arranged in a circular configuration, the respective pair of the projections each includes a second series of locking teeth arranged in a circular configuration, and the first series of locking teeth are operable to rotatably engage the second series of locking teeth. In this case, the apparatus may also comprise a pair of adjustment members. A first one of the adjustment members is operable to provide an adjustable tension between the first and second series of locking teeth of a first one of the opposing arm members and a first one of the pair of projections. A second one of the adjustment members is operable to provide an adjustable tension between the first and second series of locking teeth of a second one of the opposing arm members and a second one of the pair of projections.

In accordance with another embodiment of the present invention, an apparatus for supporting a portable electronic device is provided. The apparatus comprises means for supporting the portable electronic device and means for adjustably engaging the portable electronic device. The engaging means are operatively coupled to the supporting means. The apparatus also includes means for securing the portable electronic device to the supporting means and the engaging means, as well as means for coupling the apparatus to an adjustable extension assembly.

In one alternative, the coupling means includes an adapter section on the supporting means and a release plate disposed between the adapter section and the adjustable extension assembly. In another alternative, the supporting means includes a base member, a first pair of projections extending from the base member, and a second pair of projections extending from the base member. Here, the first and second pairs of projections preferably provide a generally planar support surface to receive the portable electronic device. The first pair of projections may be generally perpendicular to one another, and the second pair of projections may be generally perpendicular to one another.

In a further alternative, the securing means comprises a plurality of clip members, with each clip member having a main body clip and an adjustable clip slideably coupled to the main body clip. Desirably, the main body clip includes means for slideably connecting to the supporting means or the engaging means.

In accordance with a further embodiment of the present invention, a holder system for supporting and positioning a user device about a workspace is provided. The system comprises an extension arm assembly, including an adjustable arm member and a holder unit. The adjustable arm member has a first end and a second end, with a first endcap coupled to the first end of the adjustable arm member and a second endcap coupled to the second end of the adjustable arm member. The first endcap is connectable to the workspace. The holder unit includes an adapter coupled to the second endcap, a support member operable to provide a support surface for the user device, and a pair of arm members pivotally coupled to the support member. The pair of arm members are operable to adjustably size the holder unit to receive different user devices of different configurations.

In one alternative, the holder unit further comprises a plurality of connectors for securing the user device to the support member and the pair of arm members. In another alternative, the system further comprises a tilting device for adjustably positioning the user device. Here, the tilting device is coupled between the second endcap of the extension arm assembly and the adapter of the holder unit. In this case, the system may further comprise release means disposed between the adapter and the tilting device, with the release means being operable to decouple the holder unit from the tilting device. In a further alternative, the support member may comprise a set of projections arranged in an X-shaped pattern to provide the user device support surface. Here, the pair of arm members are preferably pivotally coupled to a respective pair of the support member projections.

BRIEF DESCRIPTION OF THE DRAWINGS

FIGS. 3A-G illustrate a member of the holder unit of FIG. 2 in accordance with aspects of the present invention.

FIGS. 4A-F illustrate another member of the holder unit of FIG. 2 in accordance with aspects of the present invention.

FIGS. 5A-F illustrate a release plate in accordance with aspects of the present invention.

FIGS. 6A-F illustrate an arm member in accordance with aspects of the present invention.

FIGS. 7A-F illustrate a clip member in accordance with aspects of the present invention.

FIGS. 9A-E illustrate a partial assembly of the holder unit of FIG. 2.

FIGS. 10A-D illustrate an assembly of the holder unit of FIG. 2.

FIGS. 11A-D illustrate holder units in accordance with aspects of the present invention.

FIGS. 12A-D illustrate a cover member in accordance with aspects of the present invention.

FIGS. 13A-E illustrate a locking tab in accordance with aspects of the present invention.

DETAILED DESCRIPTION

The aspects, features and advantages of the present invention will be appreciated when considered with reference to the following description of preferred embodiments and accompanying figures. In describing the preferred embodiments of the invention illustrated in the figures, specific terminology will be used for the sake of clarity. However, the invention is not intended to be limited to the specific terms so selected, and it is to be understood that each term selected includes all technical equivalents that operate in a similar manner to accomplish a similar purpose.

Figure 1B:
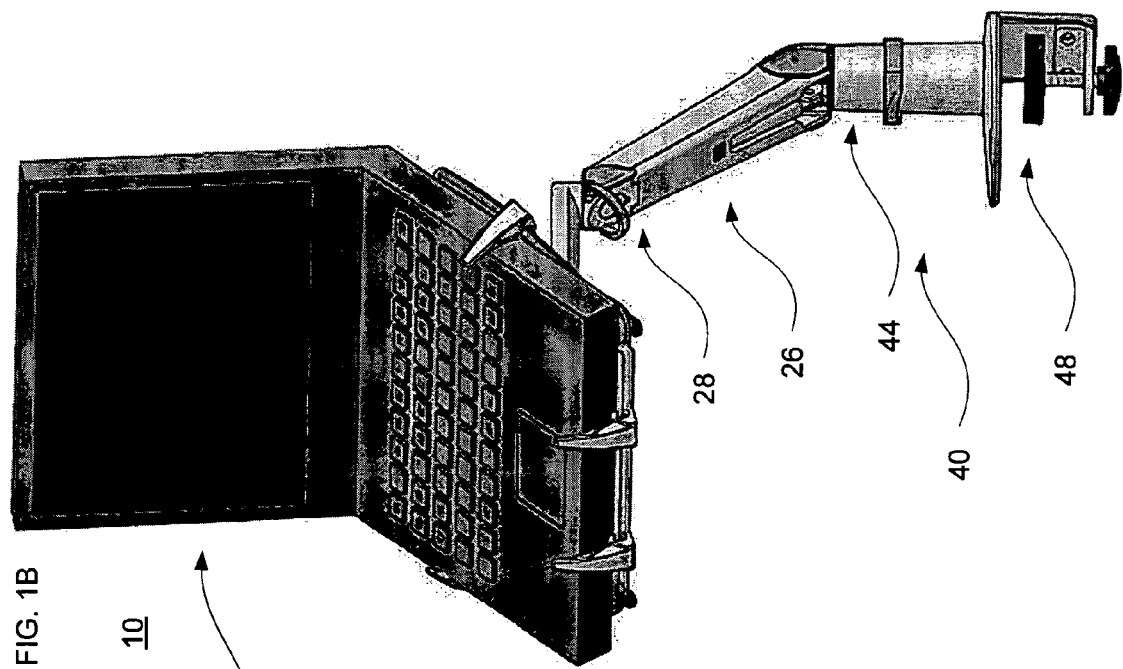
FIGS. 1A-G illustrate a holder system for adjustably mounting a portable electronic device in accordance with aspects of the present invention.
Figure 1A:
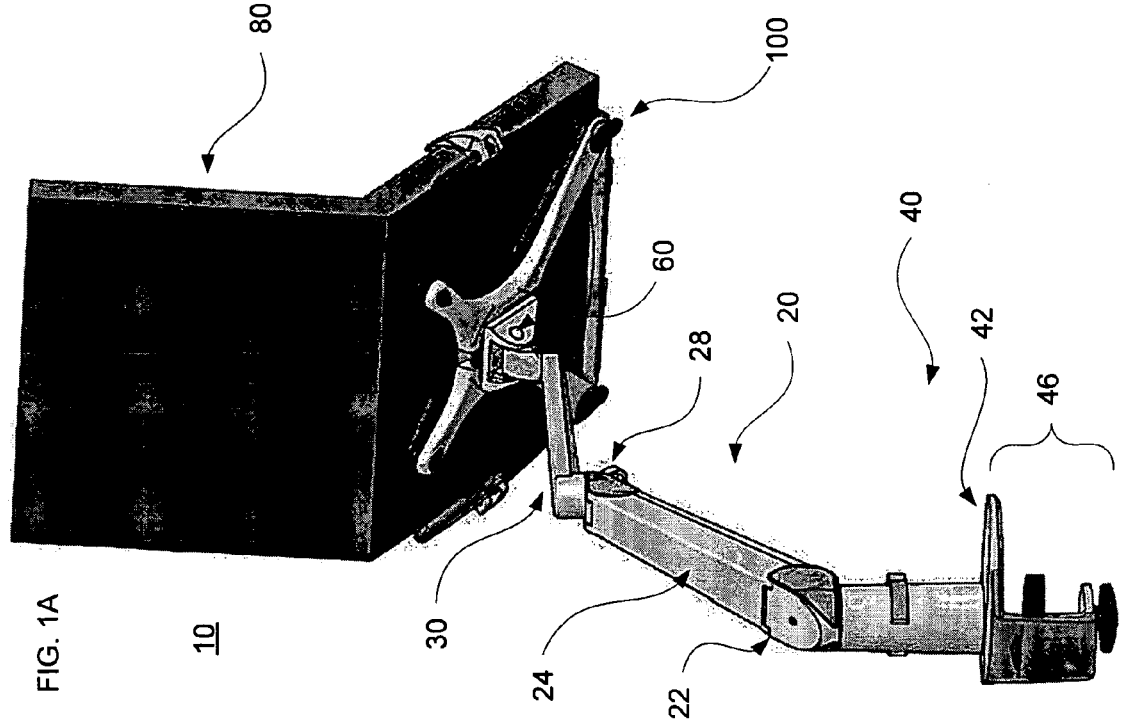
Figure 1D:
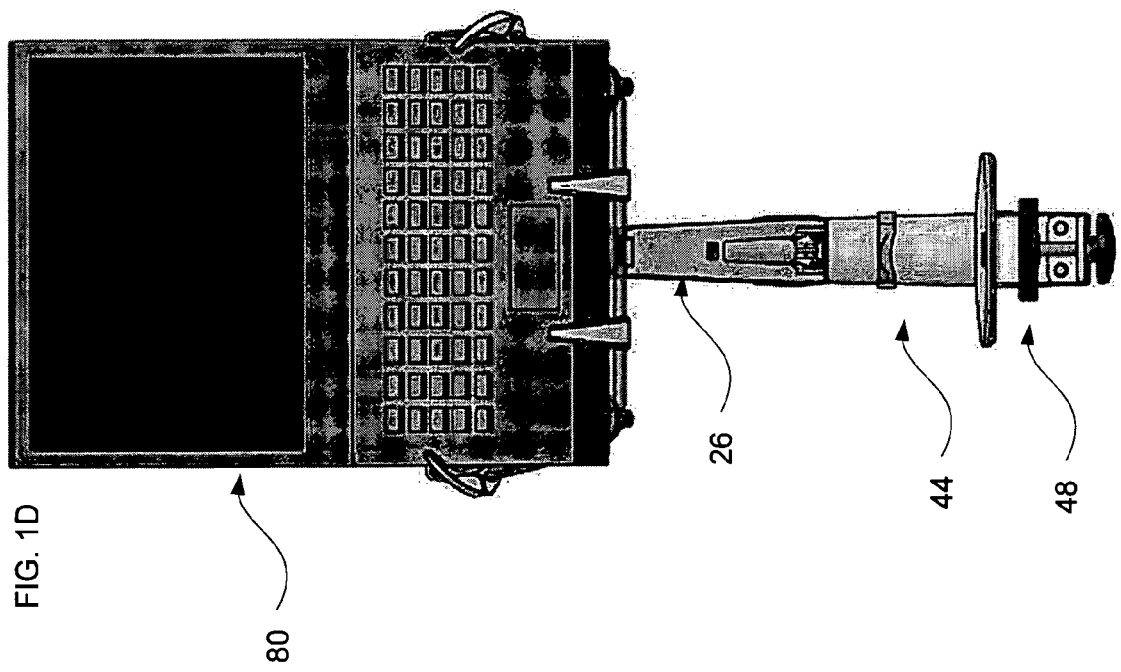
Figure 1C:
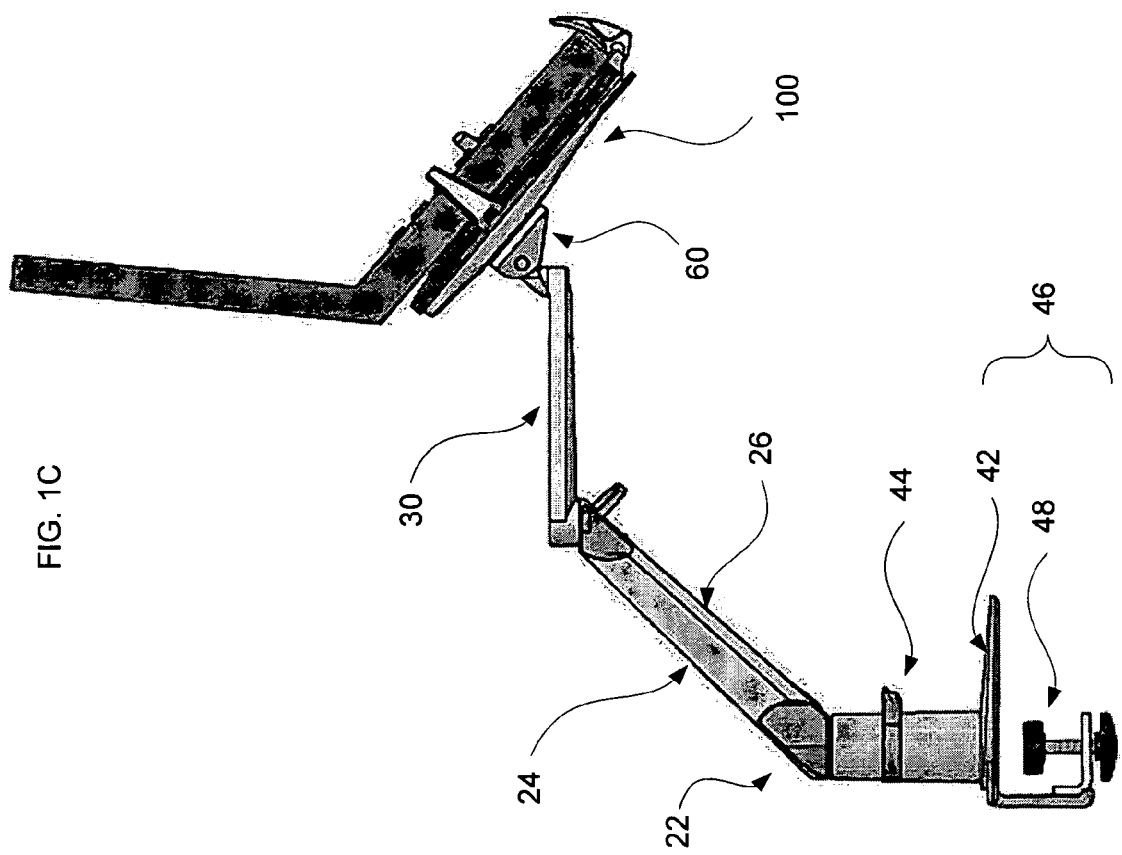
Figure 1E:
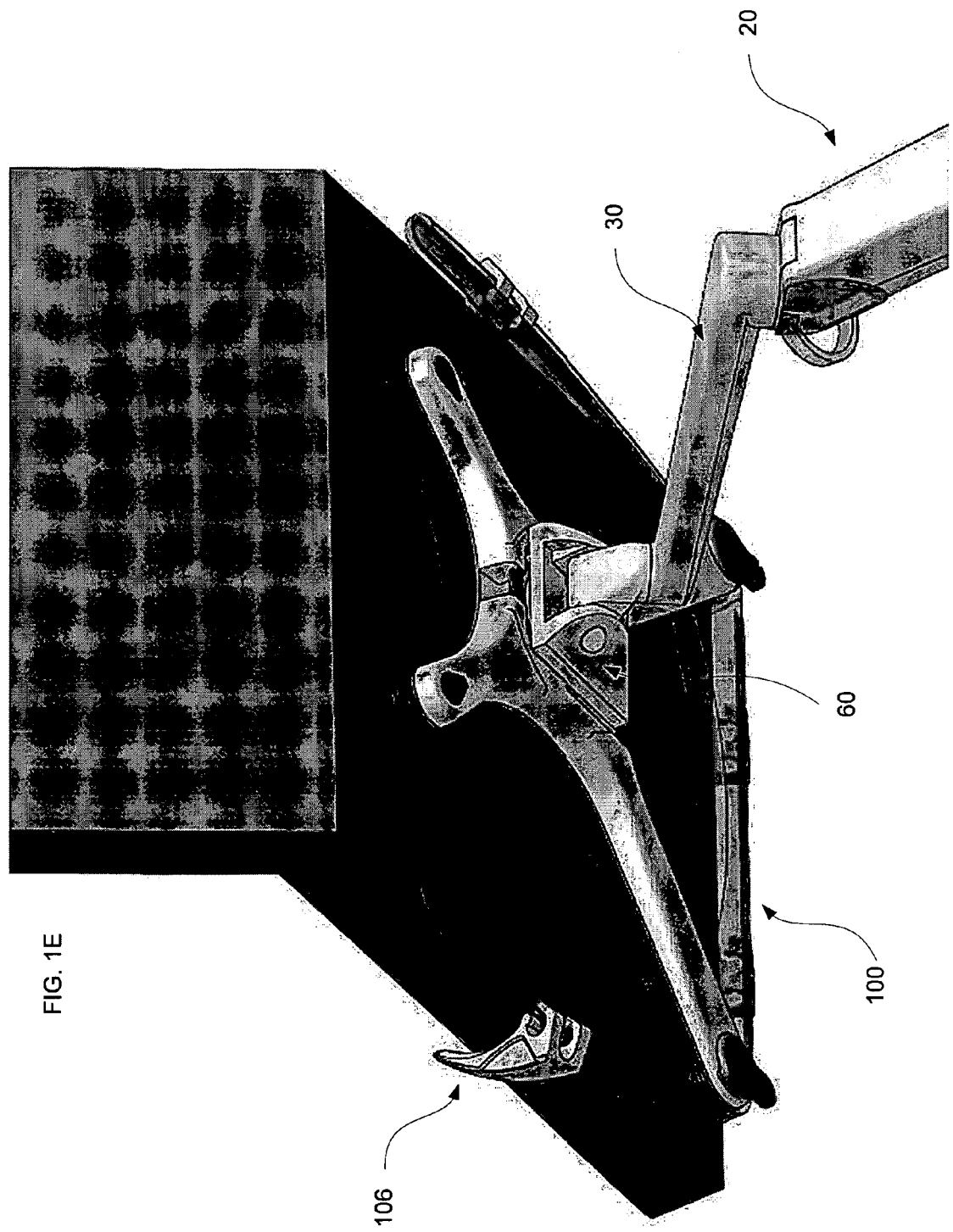
Figure 1G:
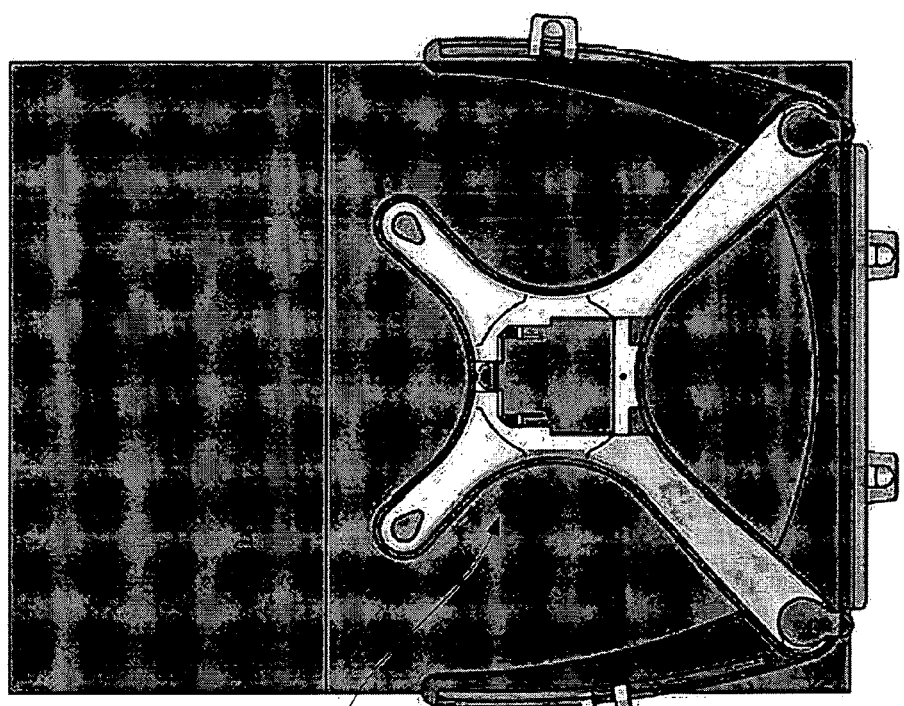
Figure 1F:
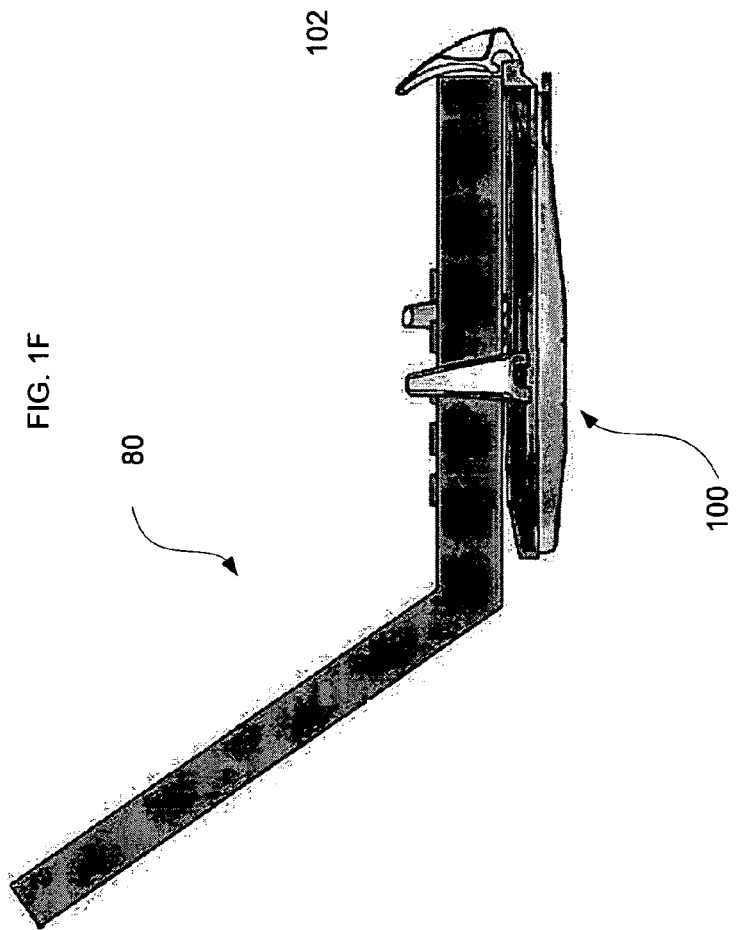

FIGS. 1A-1G illustrate a mounting system 10 having an extension arm assembly 20, a mounting assembly 40, a tilting device 60, and a holder unit 100 for supporting a portable device such as a laptop computer 80. As shown in FIGS. 1A-D, the extension arm assembly 20 is engaged at one end to the mounting assembly 40, which may secure to a piece of furniture such as a desk, a wall such as a slat wall, a section of an office cubicle, etc. At the other end of the extension arm assembly 20 is, as best seen in FIGS. 1A, 1C and 1E, the tilting device 60, which in turn couples to the holder unit 100. The holder unit 100 securely receives the laptop computer 80 or other portable device, for instance as shown in FIGS. 1F and 1G.

As illustrated in FIGS. 1A-D, the extension arm assembly 20 preferably includes a first endcap 22, an upper channel 24, a lower channel 26, a second endcap 28, and a forearm extension 30. An extension and retraction device, such as a gas spring (not shown), is preferably contained within the extension arm assembly 20 to permit adjustment of the assembly 20 and to retain a selected position. Various types and configurations of extension arm assemblies 20 may be employed with the present invention. For example, aforementioned U.S. Pat. No. 6,478,274 presents in FIGS. 8-13 and the accompanying description thereof particular configurations of extension arm assemblies. Aforementioned U.S. Pat. No. 6,409,134 presents in FIGS. 8-16 and the accompanying description thereof other configurations of extension arm assemblies. U.S. Pat. No. 6,619,606, entitled "Arm Apparatus for Mounting Electronic Devices with Cable Management System," which is fully incorporated by reference herein, presents in FIGS. 8-30 and the accompanying description thereof further extension arm assembly configurations. Furthermore, U.S. patent application Ser. Nos. 11/141,348 and 11/141,425, entitled "Angled Mini Arm Having a Clevis Assembly" and "Tapered Mini Arm Having an Anti-Loosening Mechanism," respectively, are also fully incorporated by reference herein. Both patent applications present in FIGS. 8-29 and the accompanying descriptions thereof alternative configurations of extension arm assemblies.

The mounting assembly 40 may include a base 42 and a mounting unit such as mounting cup 44 disposed thereon. The mounting cup 44 preferably includes an opening or receptacle (not shown) adapted to receive the first endcap 22. A connecting member 46 such as a bracket may have a threadedly engaged fastening mechanism 48, which can be used to temporarily or permanently secure the mounting assembly 40 to a piece of furniture, a wall, or other stable support.

The tilting device 60 may comprise known components, such as those shown and described in U.S. Pat. No. 6,505,988, entitled "Tilter for Positioning Electronic Devices," which is fully incorporated by reference herein. In particular, FIGS. 1-9 of the patent illustrate a tilter 10 including a support block 20 attached to a support block shaft 30, a center tilt mount 40 pivotally attached to the support block 20 by a support block bushing 50, a tilter roller shaft 60, and a set screw 12 for preventing rotation of the tilter 10. Alternative tilter devices are shown and described in U.S. patent application Ser. No. 11/058,820, entitled "Quick Release Assembly for an Electronic Device," which is fully incorporated by reference herein. In particular, applicants refer to FIGS. 3-11 and the accompanying description thereof in the '820 application for a tilter assembly that includes a mechanism for quickly releasing the user's electronic device, such as a flat panel display, from a tilter device, which may be connected to an extension arm.

Figure 2:
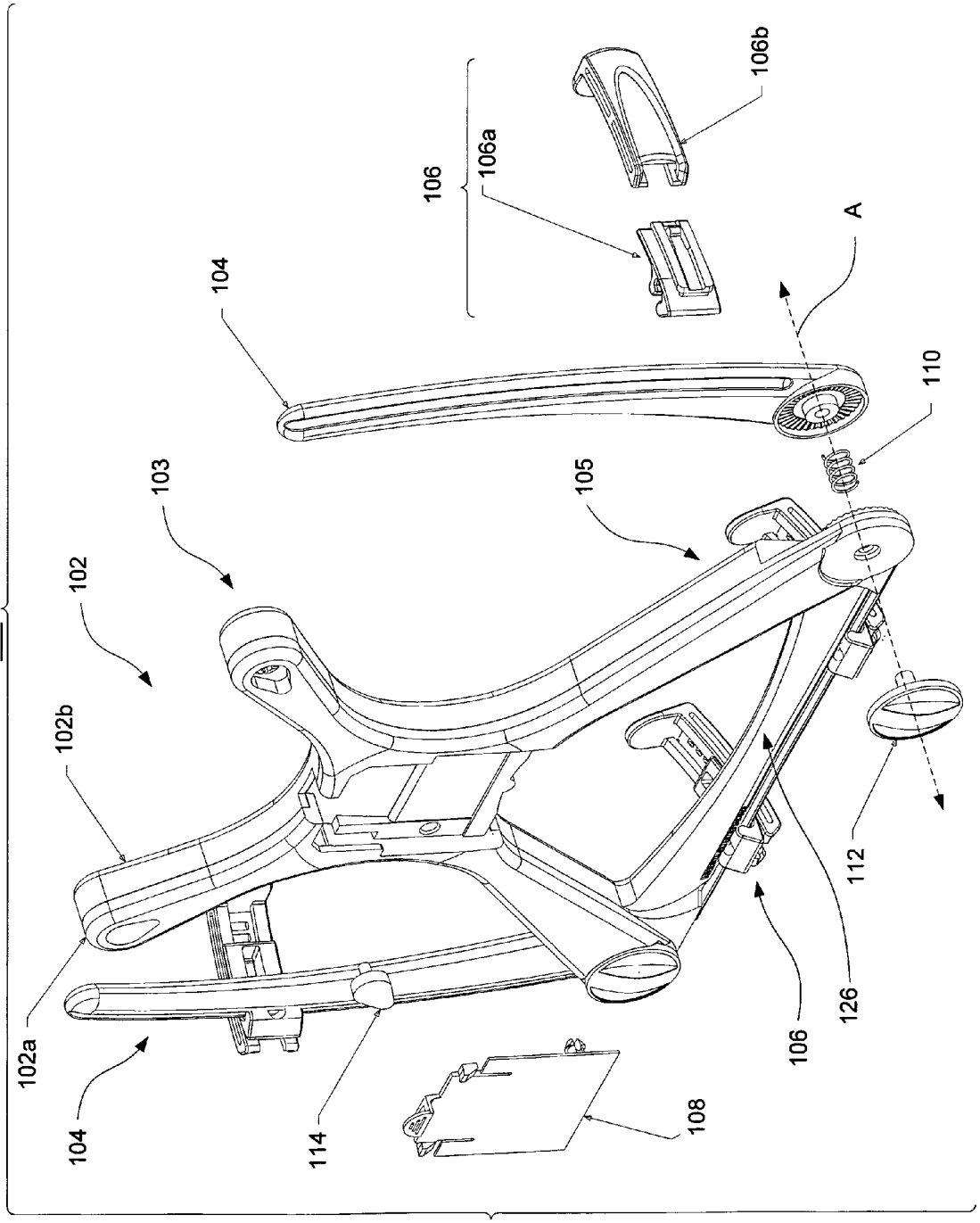
FIG. 2 is an exploded view of a holder unit in accordance with aspects of the present invention.

An exploded view of the holder unit 100 is presented in FIG. 2. Preferably, the holder unit 100 includes a support member 102, arm members 104, and clip members 106, which may each comprise a main body clip 106a and a slider clip 106b, as will be discussed in detail below. The holder unit 100 may also include a release plate 108, spring devices 110, adjustment members 112, and cover members such as caps 114.

The support member 102 desirably includes a pair of upper extensions 103 and a pair of lower extensions 105, although any number of upper and lower extensions may be provided, including no upper or lower extensions. As shown, the support member 102 desirably includes first and second members 102a and 102b, respectively. As will be explained in more detail below, the first member 102a connects to the tilting device 60 and the laptop computer or other user device rests on the second member 102b. The release plate 108 enables a user to quickly separate the holder unit 100 from the extension arm assembly 20 and the tilting device 60.

FIGS. 3A-G illustrate the second member 102b of the support member 102. As shown, the second support member 102b has a body 120 having a first pair of extensions 122 and a second pair of extensions 124 arranged in a generally star-shaped or X-shaped pattern, although other geometrical shapes and patterns may be employed. The first pair of extensions 122 may be shorter (or longer) in length than the second pair of extensions 124. The second pair of extensions 124 is preferably connected by a support 126. The support 126 preferably includes a clip receiving portion 127 onto which the clip members 106 may be slideably connected.

FIG. 3A presents a front view showing a first face 128 of the second support member 102b, which the laptop or other portable device rests upon. On the first face 128, the body 120, including the first pair of extensions 122 and the second pair of extensions 124 is preferably generally planar. In other words, the body 120 on the first face 128 need not be perfectly smooth, but should be basically flat so that the portable device can stably rest thereon. In this figure it can be seen that the first face 128 desirably includes generally circular portions 130 having a series of ridges such as locking teeth 132 arranged therealong. The portions 130 are preferably disposed at the ends of the second pair of extensions 124 adjacent the support 126. The locking teeth 132 are configured to interoperate with locking teeth of the arm members 104, as will described below. FIG. 3G presents an enlarged view of the locking teeth 132.

As seen, in the side, rear and top views of FIGS. 3B-D, respectively, second face 134 of the support member 102b may include one or more connectors 136. The connectors 136 are used to couple the second support member 102b to the first support member 102a. The connectors 136 may each comprise a plurality of segments which may be partially or fully separate from one another. The segments are preferably flexible, so that they may bend towards one another during insertion into a corresponding receptacle or through-hole on the first support member 102a, and then may return to non-bent positions for securing the second support member 102b to the first support member 102a.

As seen in the front and rear perspective views of FIGS. 3E and 3F, respectively, as well as the front and rear views of FIGS. 3A and 3C, the second support member 102b preferably also includes receptacles or through holes 138. The receptacles/through holes 138 may be centrally disposed in the circular portions 130.

The second support member 102b may comprise any number of materials such as plastics or metals, or combinations thereof. Preferably, the second support member 102b comprises a plastic, which may be molded or otherwise fabricated as a single piece.

FIGS. 4A-4F illustrate the first support member 102a in detail. As shown, the first support member 102a has a body 140 having a first pair of extensions 142 and a second pair of extensions 144 arranged in a generally star-shaped or X-shaped pattern, although other geometrical shapes and patterns may be employed. The first pair of extensions 142 may be shorter (or longer) in length than the second pair of extensions 144. The first and second pairs of extensions 142 and 144 are preferably of the same general size and shape as the first and second pairs of extensions 122 and 124 of the second support member 102b described above.

A pair of receptacles/through holes 143 is preferably disposed on the first pair of extensions 142, and another pair of receptacles/through holes 145 is preferably disposed on the second pair of extensions. The first pair of through holes 143 is configured to receive the connectors 136 of the second support member 102b. The second pair of through holes 145 is aligned with the through holes 138 of the second support member 102b.

The body 140 includes an adapter section 146. Alternatively, the side edges may have any other geometric shape. The first support member 102a preferably comprises a metal such as aluminum, and may be cast or otherwise fabricated as a single unit. However, the first support member 102a may be formed using plastic or other materials. Alternatively, the adapter plate 212 could be fabricated from two or more components.

As seen in FIG. 4A, first face 148 may include one or more receptacles or regions 150 to assist in securing the first support member 102a to the tilting device 60, for instance via a rotatable plate (not shown). The adapter section 146 preferably includes one or more attachment points to connect to the release plate 108. For example, the adapter section 146 may include a series of receptacles or through-holes 152 and/or slots 154. The through-holes 152 may be countersunk on the first face 148. The slots 154 are preferably provided to enable fabrication (e.g., casting) of one or more tabs 156, which may be located on second face 158 of the first support member 102*a*. See FIGS. 4A and 4D. As shown in FIGS. 4C, 4E and 4F, the adapter section 146 may also include an opening or recess 16.0 at or near the top of the adapter section 146.

As seen in FIGS. 4C and 4F, the second face 158 preferably includes a surface 162, which may be angled so that it tapers from a larger thickness 164 near a first end 166 thereof to a narrower thickness 168 near a second end 170 thereof. The second face 158 may also include a pair of surfaces 172*a*,*b*, that may be integral with or separate from the surface 162. The surfaces 172*a*,*b* are preferably substantially planar relative to one another.

Figure 5F:
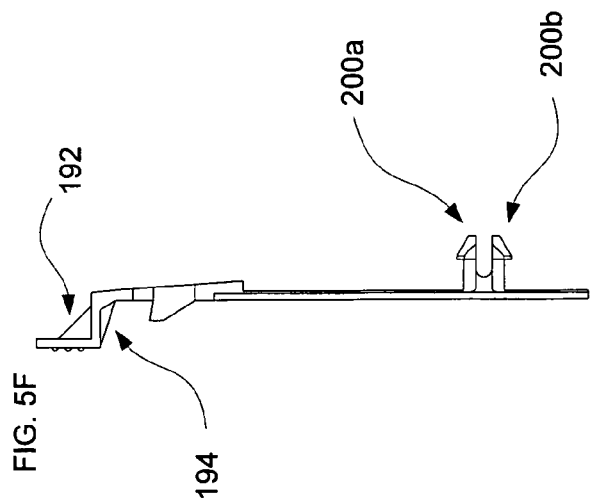
Figure 5E:
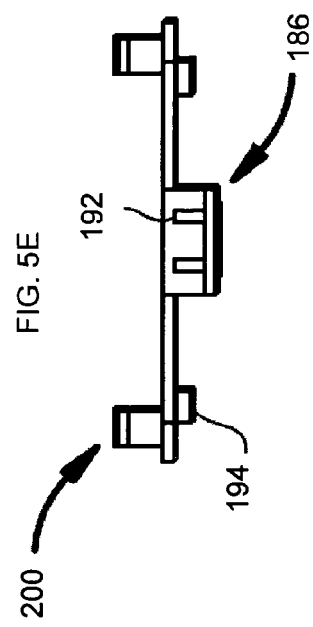
Figure 5D:
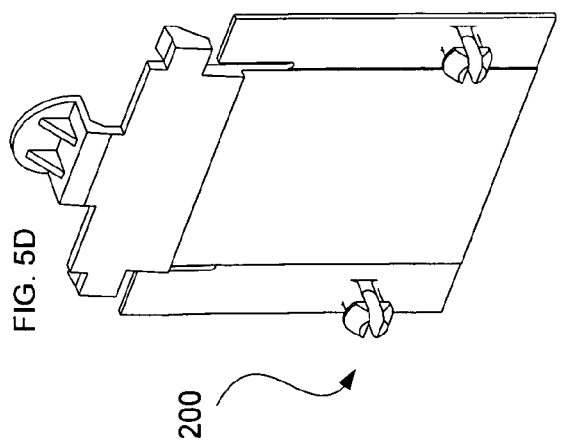

FIGS. 5A-F illustrate views of the release plate 108. The release plate 108 has a main body 180 with a front side 182 and a rear side 184. In particular, FIG. 5A illustrates the front side 182, FIG. 5B illustrates the rear side 184, FIG. 5C illustrates a perspective view of the front side 182, and FIG. 5D illustrates a perspective view of the rear side 184. FIG. 5E illustrates a view of a first end 186 of the release plate 108. FIG. 5F illustrates a right side view of the release plate 108, the left side being a mirror image thereof. The release plate 108 is preferably formed of a plastic such as DELRIN® brand acetal resin from E.I. Du Pont De Nemours and Company Corporation, and may be cast as a single unit. However, the release plate 108 may be formed using a metal, such as spring steel, or other materials. The release plate 108 may be integrally molded or otherwise fabricated as a single unit. Alternatively, the release plate 108 could be fabricated from two or more components.

The front side 184 of the release plate 108 preferably includes a post 188 disposed at or proximate to the first end 186. The post 188 may be reinforced by one or more supports 190 and/or one or more supports 192. In place of the post 188, any other device or mechanism that can function as a release mechanism may be employed. By way of example only, a recess or depression can be used. The front side 180 preferably also includes one or more bosses 194 or other projections, and may also include a pair of arms 196 extending substantially parallel to one another, as seen in FIG. 5A. The arms 196 may be partially separated from the main body 180 of the release plate 108 by slits or gaps 198.

The rear side 154 of the release plate 108 preferably includes one or more connectors 200 that are adapted to engage the receptacles or through-holes 152 of the first support member 102*a*. As seen in the side view of FIG. 5F, the connectors 200 may each comprise first and second halves 200*a*,*b*, which may be partially or fully separate from one another. The halves 200*a*,*b* are preferably flexible, so that they may bend towards one another during insertion into the receptacle/through-hole 152, and then may return to non-bent positions for securing the release plate 108 to the first support member 102*a*. Desirably, the connectors 200 are chosen so that the release plate 108 is securely affixed or permanently affixed to the first support member 102*a*.

FIGS. 6A-F illustrate views of one of the arm members 104. The arm member 104 depicted is the right side arm member. The left side arm member is preferably a mirror image of or otherwise generally symmetrical with the right side arm member. Each arm member has an elongated body 202 with a front side 204 and a rear side 206. The elongated body 202 may be curved as shown, may be straight, or may have another configuration that may be selected according to functional and/or aesthetic requirements. Preferably, at least one arm member 104 is provided for each lower extension 105. In an alternative, an arm member 104 is provided for each upper extension 103 and each lower extension 105. In a further alternative, an arm member 104 is provided for each upper extension 103.

Figure 6E:
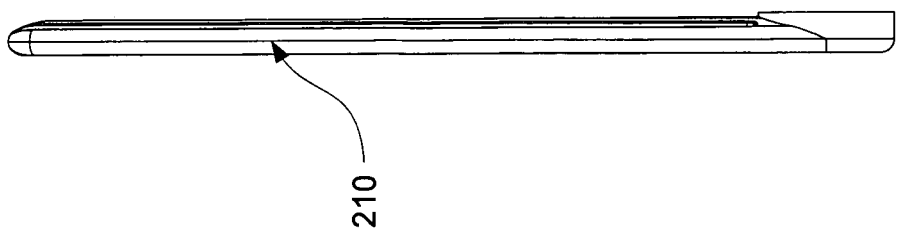
Figure 6D:
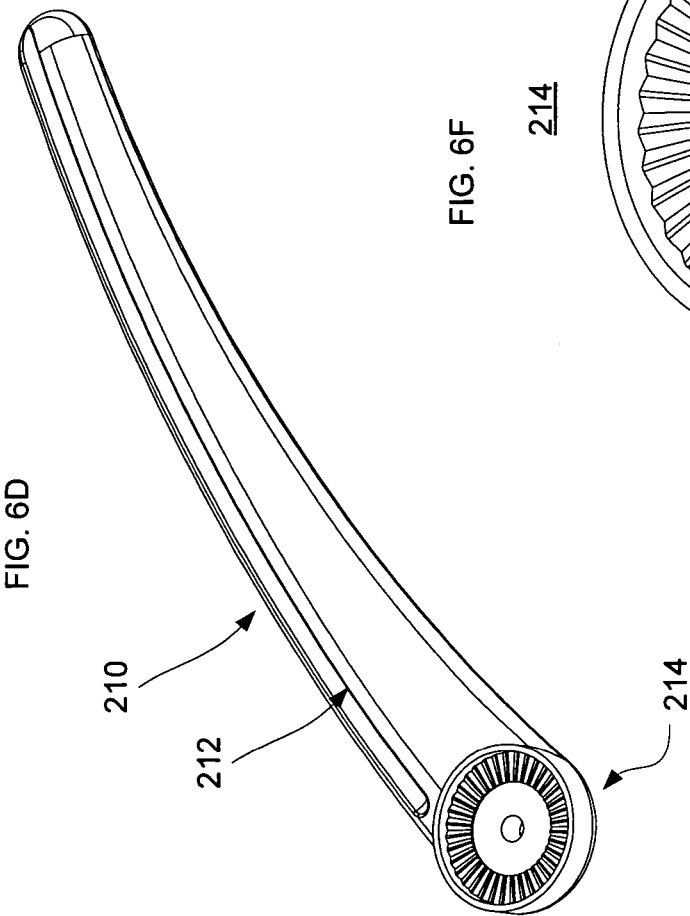

FIG. 6A illustrates the front side 204, FIG. 6B illustrates the rear side 206, FIG. 6C illustrates a perspective view of the front side 204, and FIG. 6D illustrates a perspective view of the rear side 206. FIG. 6E illustrates a side view of the arm member 104. The arm member 104 may comprise any number of materials such as plastics or metals, or combinations thereof. Preferably, the arm member 104 comprises a plastic, which may be molded or otherwise fabricated as a single piece. Alternatively, the arm member 104 could be fabricated from two or more components.

As shown in FIGS. 6A and 6C, the front side 204 preferably includes a recess 208 disposed along or adjacent to a first edge 210 of the arm member 104, which provides a connecting surface for receiving clip member 106. While shown as a single recess 208 that extends along most of the first edge 210, the recess may comprise two or more separate or semi-connected recesses disposed along the first edge 210. Alternatively, instead of a recess, the connecting surface may comprise one or more raised projections along the first edge 210.

As shown in FIGS. 6B and 6D, the rear side 206 preferably also includes a recess 212 disposed along or adjacent to the first edge 210 of the arm member 104. The recess 212 provides a complementary connecting surface for receiving clip member 106, and is preferably of the same configuration as the recess 208. While shown as a single recess 212 that extends along most of the first edge 210, the recess 212 may comprise two or more separate or semi-connected recesses disposed along the first edge 210. Alternatively, instead of a recess, the connecting surface may comprise one or more raised projections along the first edge 210. Preferably, the first and second sides 204 and 206 each include the recesses or the raised projections. However, it is also possible for one of the sides to include a recess or recesses while the other side includes one or more raised projections.

Figure 6F:
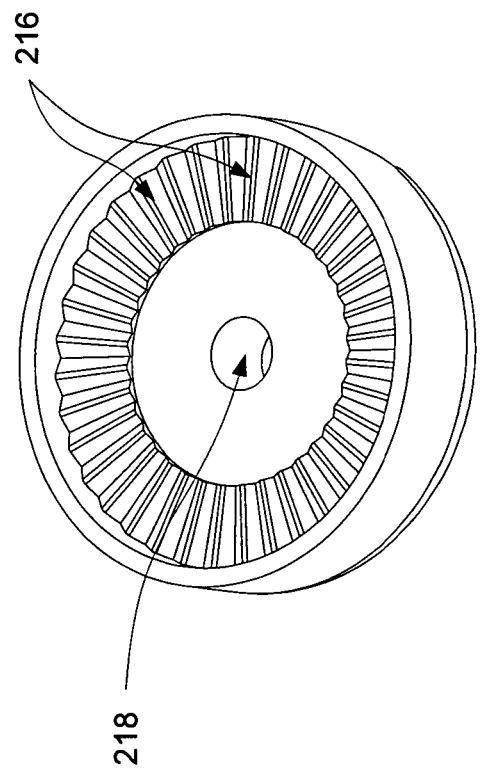

The rear side 206 desirably includes a generally circular portion 214 having a series of ridges such as locking teeth 216 arranged therealong, which is shown in more detail in FIG. 6F. The locking teeth 216 may be, for instance, triangular in shape. Regardless of the specific shape, the locking teeth 216 are dimensions to interoperate with the locking teeth 132 of the portions 130 described above. The rear side 206 desirably also includes a receptacle or hole 218 that is aligned with one of the receptacles/through holes 138 and one of the receptacles/through holes 145 during assembly. The receptacle/through hole 218 may be threaded to receive a threaded fastener.

Figure 7A:
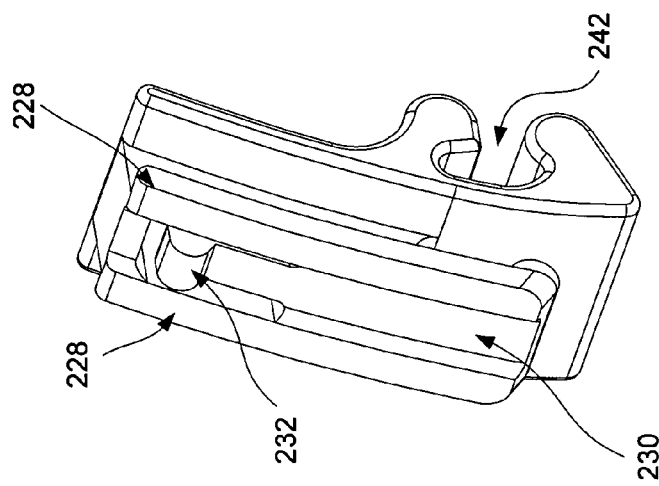
Figure 7B:
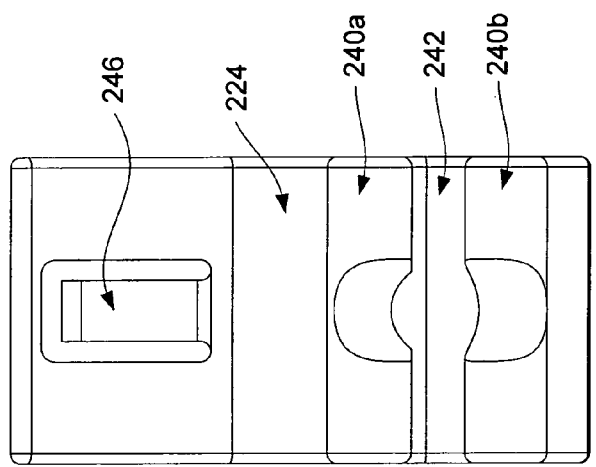
Figure 7C:
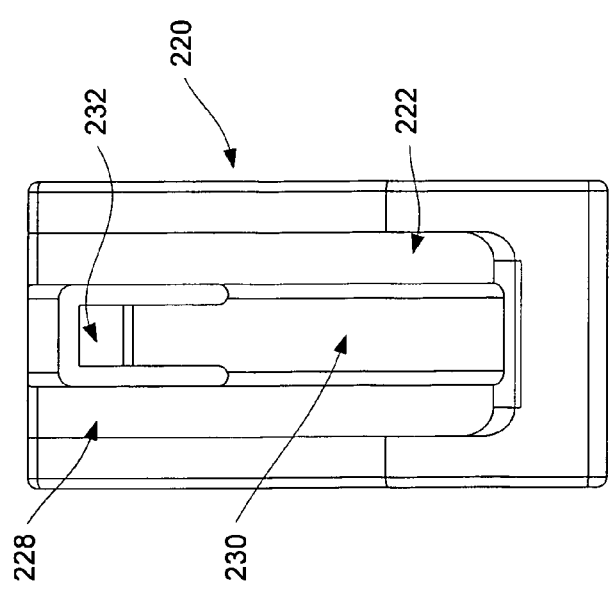

FIGS. 7 and 8 illustrate portions of the clip member 106. The clip member 106 may comprise a single component or multiple components. These two figures present a preferred example employing two components, namely the main body clip 106*a* as shown in FIG. 7 and the slider clip 106*b* as shown in FIG. 8. Specifically, FIGS. 7A-F illustrate views of the main body clip 106*a*, and FIGS. 8A-F illustrate views of the slider clip 106*b*.

The main body clip 106*a* has a main body 220 with a first portion 222 and a second portion 224. In particular, FIG. 7A illustrates the first portion 222, FIG. 7B illustrates the second portion 224, FIG. 7C illustrates a perspective view of the first portion 222, and FIG. 7D illustrates a perspective view of the second portion 224. FIG. 7E illustrates a view of a first end 226 of the of the main body clip 106a. FIG. 7F illustrates a side view of the main body clip 106a, the other side being a mirror image thereof. The main body clip 106a may comprise any number of materials such as plastics or metals, or combinations thereof. Preferably, the main body clip 106a comprises a plastic, which may be molded or otherwise fabricated as a single piece.

As shown in FIG. 7A, the first portion 222 is preferably an elongated member having a pair of channel members 228 therealong. The channel members 228 are spaced apart and have an elongated slot 230 therebetween. A tab 232 or other projection is preferably also disposed between the channel members 228, as shown in FIGS. 7A and 7C. As shown, the tab 232 may be disposed at or near a second end 234 of the main body clip 106a. The channel members 228, the slot 230 and the tab 232 are used when connecting to the slider clip 106b.

As best seen in FIG. 7F, the first portion 222 may also include a projection or tab 236, which may be adjacent to the first end 226. Here, the tab 236 preferably helps to define a recess 238 between part of the first portion 222 and second portion 224.

FIGS. 7B, 7D and 7F illustrate that the second portion 224 includes a connector 240, which desirably comprises a pair of connector members 240a and 240b. The connector members 240a and 240b are used to slideably connect the main body clip 106a to the clip receiving portion 127 of the second support member 102b. In a preferred embodiment, the connector members 240a,b define a receptacle 242 therebetween. The receptacle 242 is preferably sized to fit along the clip receiving portion 127. Most preferably, the receptacle 242 and the connector members 240a,b slideably engage the clip receiving portion 127. The receptacle 242 and the connector members 240a,b are also preferably configured to slideably engage the recesses 208 and 212 on arm member 104. Thus, it can be seen that main body clip 106a can be used to connect to both the support member 102 and the pair of arm members 104.

The second portion 224 may also include a recessed portion 246 therein, which may be disposed adjacent the second end 234 of the main body 220.

Figure 8C:
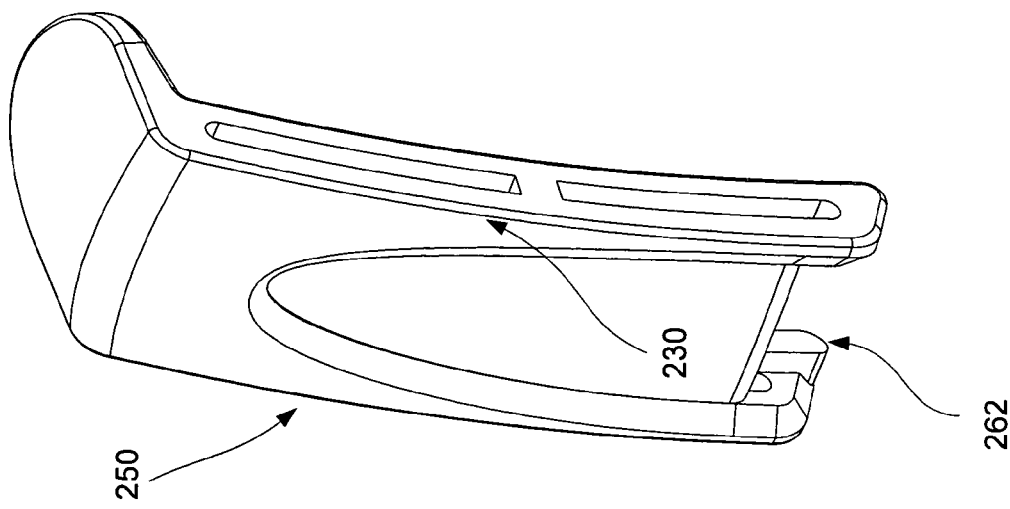
FIGS. 8A-F illustrate another clip member in accordance with aspects of the present invention.
Figure 8B:
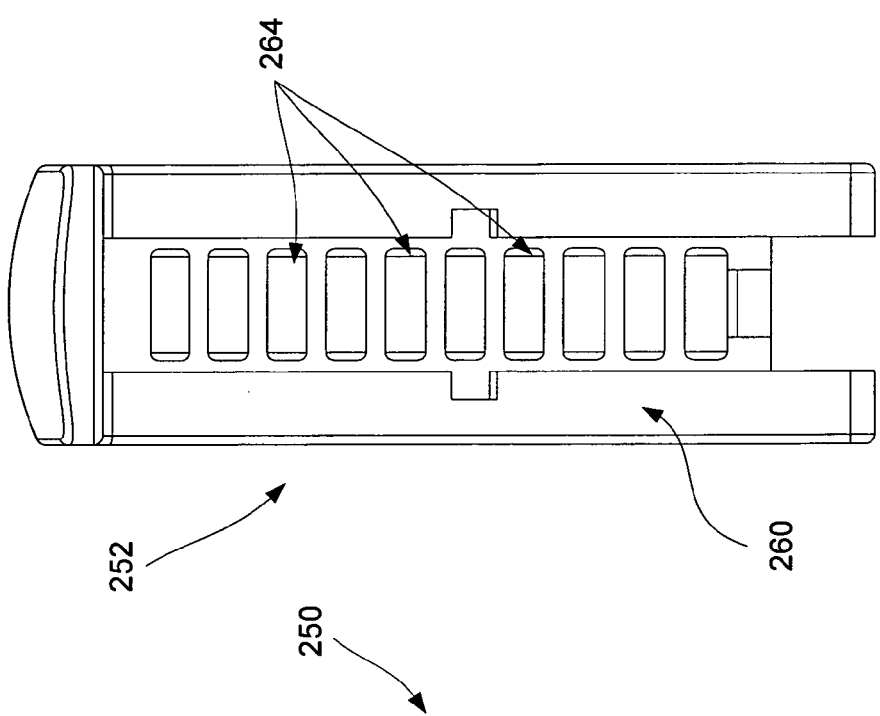
Figure 8A:
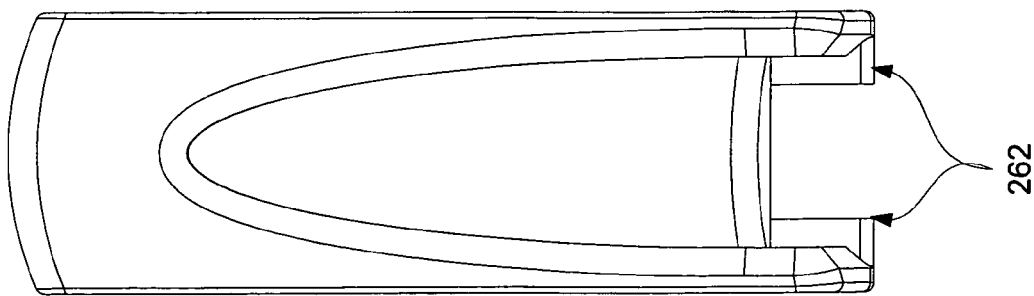
Figure 8F:
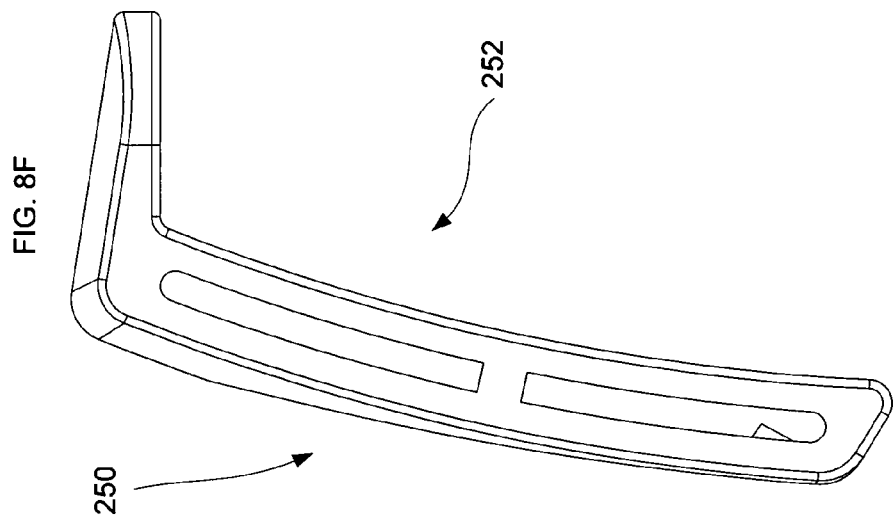
Figure 8E:
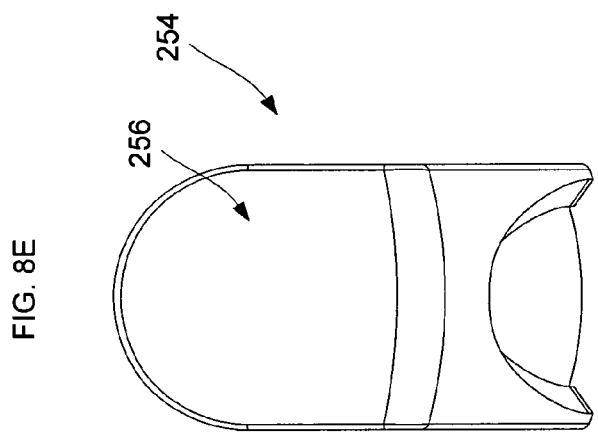
Figure 8D:
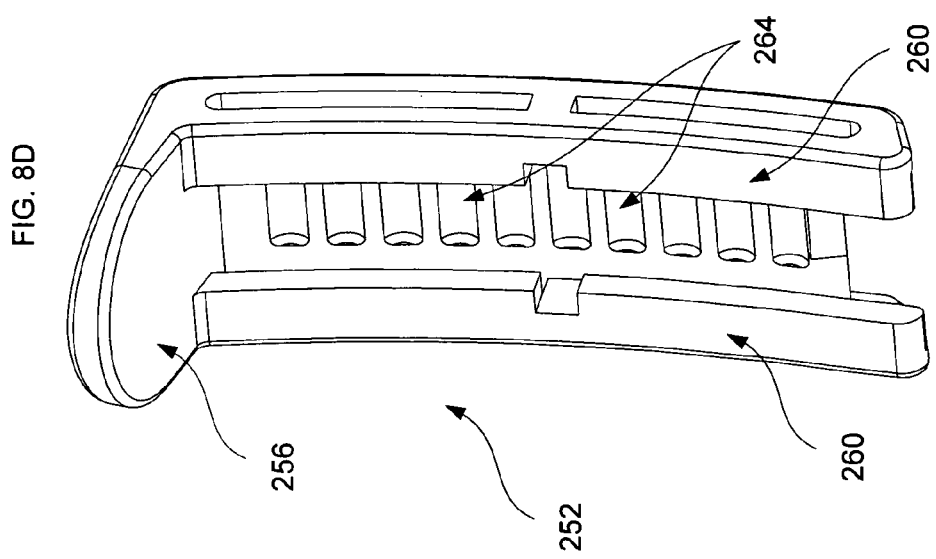

As shown in FIGS. 8A-F, the slider clip 106b has a main body 248 with a first side 250 and a second side 252. In particular, FIG. 8A illustrates the first side 250, FIG. 8B illustrates the second side 252, FIG. 8C illustrates a perspective view of the first side 250, and FIG. 8D illustrates a perspective view of the second side 252. FIG. 8E illustrates a view of a first end 254 of the of the slider clip 106b, which includes a tab 256. This view also illustrates a contoured section 258 along the first side 250. FIG. 8F illustrates a side view of the slider clip 106b, the other side being a mirror image thereof.

The slider clip 106b may comprise any number of materials such as plastics or metals, or combinations thereof. Preferably, the slider clip 106b comprises a plastic, which may be molded or otherwise fabricated as a single piece. More preferably, the slider clip 106b is made of the same material or materials as the main body clip 106a.

As best seen in FIGS. 8B and 8D, the second side 252 preferably includes a pair of sidewalls 260 each having a channel member 262 therealong. The channel members 262 are configured to slideably couple to the pair of channel members 228 on the main body clip 106a. The second side 252 desirably also includes at least one, and more preferably a series of receptacles 264 disposed between the sidewalls 260. The receptacles 264 are dimensioned to receive the tab 232 or other projection on the main body clip 106a.

Assembly of the holder unit 100 will now be described with reference to FIGS. 9-11. As shown in FIGS. 9A-E, the first support member 102a and the second support member 102b may be fitted together in the case where the support unit 102 is not integrally formed as a single component. Specifically, the connectors 136 on the second face 134 of the second support member 102b may be press fit to securely engage the pair of receptacles/through holes 143 on the first pair of extensions 142 of the first support member 102a. Of course, it should be appreciated that the connectors 136 may be part of the first support member 102a and the receptacles/through holes 143 may be disposed on the second support member 102b. Other fastening means may be employed to connect the first support member 102a and the second support member 102b, such as clips, clasps, hasps, threaded fasteners such as screws or bolts, etc. The second pair of receptacles/through holes 145 on the first support member 102a is aligned with the receptacles/through holes 138 of the second support member 102b.

As seen in FIGS. 9A and 9C, the release plate 108 couples to the adapter section 146 of the first support member 102a. The connectors 200 on the rear side 184 of the release plate 108 engage the receptacles 152 in the adapter section 146, and the bosses 194 protrude away from the rear side 184. In an alternative embodiment, the rear side 184 of the release plate 108 may include receptacles and the adapter section 146 may include connectors to attach thereto. In fact, any type of fastening means is possible between the release plate 108 and the adapter section 146. The release plate 108 may be permanently affixed to the adapter section 146. The post 188 on the release plate 108 is preferably at least partly received in the opening/recess 160 of the adapter section 146. The pair of arms 196 preferably contact the pair of surfaces 172a,b. At this point, the main body 180 and the arms 196 of the release plate 108 preferably lie along the same plane.

FIGS. 10A-D illustrate how the clip members 106 attach to both the arm members 104 and the support member 102, and how the arm members 104 attach to the support member 102. The main body clips 106a may be first attached to the arm members 104 and the support member 102, and then the slider clip members 106b may be connected to respective ones of the main body clips 106a. Alternatively, the slider clip members 106b may be connected to the main body clips 106a first and then the pairs of main body clips 106a and slider clip members 106b may be attached to the arm members 104 and the support member 102.

In use, the slider clip 106b is adapted to slide up and down along the channel members 228 on the main body clip 106a, and the tab 232 is received within one of the receptacles 264. The slider clip 106b may be positioned by a user to an appropriate height so that the tab 256 on the first end 254 of the slider clip engages a surface of the laptop computer or other device which is being supported. Each main body clip 106a may be positioned along either the clip receiving portion 127 or one of the arm members 104.

While the main body clips 106a and the slider clips 106b are preferred, it should be understood that single or multi-piece clips of other configurations may be employed in place of or in conjunction with the main body clips 106a and the slider clips 106b. In alternative embodiments, different types of connectors may be used. For instance, a retaining bar and/or a retaining strap may be used in place of some or all of the clip members 106 to secure the laptop computer or like device to the holder unit 100.

As discussed above with respect to FIG. 2, the holder unit 100 may also include spring devices 110 and adjustment members 112. The spring devices 110 are preferably coiled or wound springs. The adjustment members 112 are preferably threaded knobs. While not required, the spring devices 110 are preferably placed about the shafts of the threaded knobs, as shown in FIGS. 10A and 10B. The threaded knobs are then attached to the first and second support members 102a and 102b. Specifically, the shafts of the threaded knobs are inserted through the receptacles/through holes 138 and the receptacles/through holes 145. The knob threads desirably engage with threads on one or both of the receptacles/through holes 138 and the receptacles/through holes 145, as well as with threads on the receptacle/through hole 218 of the arm member 104.

Other types and configurations of the adjustment members 112 may be provided. For instance, as shows in FIGS. 11B-C, locking tabs 112, or other connectors may be used to secure the arm members 104 to the first support member 102a and/or to the second support member 102b. If locking tabs are employed, the tabs may engage a portion of the arm members 104 to prevent movement thereof.

For instance, as shown in FIGS. 13A-E, the locking tab 112, preferably includes a cover 113 and a shaft 115, which may be threaded as with the shaft of adjustment member 112. Desirably one or more tab members 117 are provided. A grip portion 119 may also be included. As with the adjustment member 112, the threaded shaft may be inserted through the receptacles/through holes 138 and the receptacles/through holes 145. The threads of the shaft 115 desirably engage with threads on one or both of the receptacles/through holes 138 and the receptacles/through holes 145, as well as with threads on the receptacle/through hole 218 of the arm member 104. The one or more tab members 117 may engage with a portion of the support member 102 to prevent rotation/movement of the locking tab $112_1$.

In an alternative, the arm member 104 may include a shaft portion. In this case, the shaft 115 may be omitted from the locking tab, as shown with locking tab $112_2$ of FIGS. 14A-E. Here, a receptacle or through hole 121 may be used to receive the shaft of the arm member 104. The receptacle/through hole 121 may or may not be threaded.

Returning to FIG. 10, FIG. 10D illustrates a cutaway view along the A-A line of FIG. 10C, and shows engagement of the adjustment member 112 with the first and second support members 102a and 102b, as well as with the arm member 104. Also shown in the cutaway view is the engagement of the interlocking teeth 132 and 216. Depending upon the threading of the adjustment member 112 (or locking tab $112_1$), a user may tighten or loosen the adjustment member 112 by turning it clockwise or counterclockwise. Upon loosening, the arm member 104 may be adjusted to a desirable position to receive the laptop computer or other user device. Each arm member 104 may be individually pivotally adjusted by rotation about axis A. This permits the user to arrange the holder unit 100 in a specific configuration to support the laptop or other device, regardless of its shape.

Once the laptop computer 80 or other electronic device is securely on the holder unit 100 by the clip members 106 or other connectors, the user may freely position the laptop in a desired location and orientation by moving the extension arm assembly 20 and the tilting device 60 as desired. The extension arm assembly 20 may include a cable management system in order to hide a power cable and/or data cables which may connect the laptop to external devices such as a keyboard or mouse.

The user may remove the laptop computer 80 from the holder unit 100 by disengaging the clip members 106 or other connectors from the laptop. It is also possible to leave the laptop secured to the holder unit 100 while disengaging from the extension arm assembly 20 and the tilting device 60. For instance, the user preferably pulls, pushes or otherwise causes the post 188 or other release mechanism to move within the opening 160 of the adapter section 146 and toward or away from the laptop computer 80. This, in turn, causes the main body 180 to deflect or move away from the tilting device 60. The bosses 194 or other projections of the release plate 108 thus disengage from the holes/recesses 152 of the adapter section 146. Now the laptop 80 and the holder unit 100 may be removed, enabling the user to place them on another extension arm assembly 20 and tilting device 60, or to replace them with another laptop 89 and holder unit 100.

While the release plate 108 permits a user to rapidly disengage the holder unit 100, and the user device, if attached, from the adapter section 146, there may be situations when it is desirable to prevent inadvertent or unwanted disengagement. For example, in a high traffic environment, one would like to discourage unauthorized personnel from tampering with the equipment. A fastener or other engagement mechanism may be used to secure the release plate 108 to the adapter section 146. Thus, it becomes difficult for an unauthorized user to quickly release the holder unit 100 and the user device from the tilting device 60. Alternatively, the release plate 108 may be omitted and the holder unit 100 may be directly or indirectly secured to the tilting device 60, the extension arm assembly 20, or other support/adjustment device.

FIGS. 11A-B illustrate perspective views of the assembled holder unit 100 employing threaded knobs 112, and FIGS. 11C and 11D illustrate perspective views of the assembled holder unit 100 employing locking tabs 1121. As shown in FIGS. 11A and 1D, covers or caps 114 may be used to decoratively cover the receptacles/through holes 143. FIGS. 12A-D illustrate a perspective view, a side view, a top view and a bottom view, respectively, of the cover 266. As shown, the cover 266 may include a body portion 268 sized to fit or otherwise cover the receptacle/through hole 143. The cover 266 may also include a shaft 270 that is received within the receptacle/through hole 143. The shaft 270 may have first and second portions 270a and 270b of different diameters. The cover 266 may comprise, for example, rubber, plastic or metal, although other materials or combinations thereof may be used.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. For instance, any number of upper and/or lower extensions may be provided on the holder unit. Arm members may connect to the upper extensions, the lower extensions, or both. Clip members or other fasteners may be used to secure the user device to the holder unit in any of the embodiments of the invention.

The invention claimed is:

1. An apparatus for holding a device, the apparatus comprising:
a support including a body, a first pair of projections, and a second pair of projections extending from the body in a generally planar configuration to provide a support surface for the device, each of the projections of the first and second pairs of projections having a first end opposite the body, the support further including a supplemental support member attached to the first ends of each of the projections of the first pair of projections, the supplemental support member being disposed along the generally planar configuration;

a pair of opposing arm members, each of the pair of opposing arm members being pivotally attached to a respective first end of one of the projections of either the first or second pairs of projections, each of the pair of opposing arm members being individually rotatable about the respective first end of one of the projections so that rotation of at least one of the arm members changes an effective support size of the apparatus to support devices of different shapes without altering the support surface of the support; and a plurality of connectors operable to secure the device to the apparatus, a first one of the connectors being attached to the supplemental support member, a second one of the connectors being attached to a first one of the pair of arm members, and a third one of the connectors being attached to a second one of the pair of arm members;

wherein the first pair of projections and the second pair of projections are arranged in an X-shaped configuration.

2. The apparatus of claim 1, wherein the first pair of projections each has a first length, the second pair of projections each has a second length, and the first length is longer than the second length.

3. The apparatus of claim 1, wherein the plurality of connectors includes at least one clip member.

4. The apparatus of claim 3, wherein the supplemental support member includes a clip-receiving portion therealong for slideably receiving the at least one clip member.

5. An apparatus for holding a portable electronic user device, the apparatus comprising:

a support member including a body and a plurality of pairs of projections extending from the body in a generally planar configuration to provide a support surface for the user device;

a pair of opposing arm members each arm member pivotally attached to a projection of a respective pair of the projections; and a plurality of connectors operable to secure the user device to the apparatus, a first one of the connectors being attached to a supplement support member of the support member, a second one of the connectors being attached to a first one of the pair of arm members, and a third one of the connectors being attached to a second one of the pair of arm members, the plurality of connectors includes at least one clip member;

wherein the supplemental support member includes a clip receiving portion therealong for slideably receiving the at least one clip member; and wherein the pair of opposing arm members each include a clip receiving portion therealong, the at least one clip member comprises a plurality of clip members, a first one of the clip members being slideably connected to the clip receiving portion of the supplemental support member, a second one of the clip members being slideably connected to the clip-receiving portion of a first one of the pair of opposing arm members, and a third one of the clip members being slideably connected to the clip-receiving portion of a second one of the pair of opposing arm members.

6. An apparatus for holding a portable electronic user device, the apparatus comprising:

a support member including a body and a plurality of projections extending from the body in a generally planar configuration to provide a support surface for the user device, the support member comprising a first support member and a second support member attached to the first support member, the first support member having the support surface for receiving the user device, and the second support member having an adapter section for coupling the apparatus to an extension arm assembly, the first support member including a first set of the plurality of projections arranged in a generally x-shaped configuration, the second support member including a second set of the plurality of projections arranged in the generally x-shaped configuration, each one of the second set of projections being disposed in a facing arrangement adjacent a respective one of the first set of projections; and a pair of opposing arm members pivotally attached to a respective pair of the first set of projections.

7. The apparatus of claim 6, wherein the adapter section includes means for releasably coupling the apparatus from the extension arm assembly.

8. An apparatus for holding a device, the apparatus comprising:

a support including a body and a pair of projections extending from the body to provide a support surface for the device, each of the projections of the pair of projections having a first end opposite the body;

a pair of opposing arm members, each of the pair of opposing arm members being pivotally attached to a respective first end of one of the projections of the pair of the projections, a first one of the pair of opposing arm members being individually rotatable about a first axis at the end of a first one of the projections of the pair of projections, a second one of the pair of opposing arm members being individually rotatable about a second axis at the end of a second one of the projections of the pair of projections, the first and second opposing arm members being individually rotatable about a plane of the support surface so that rotation of at least one of the opposing arm members changes an effective support size of the apparatus to support devices of different shapes without altering the support surface of the support, the pair of opposing arm members each includes a first series of locking teeth arranged in a circular configuration, the respective pair of the projections each includes a second series of locking teeth arranged in a circular configuration, and each of the first series of locking teeth are operable to rotatably engage a respective one of the second series of locking teeth;

a plurality of connectors operable to secure the device to the apparatus, a first one of the connectors being attached to a supplemental support member of the support, a second one of the connectors being attached to the first one of the pair of opposing arm members, and a third one of the connectors being attached to the second one of the pair of opposing arm members; and a pair of adjustment members, a first one of the adjustment members being operable to provide an adjustable tension between the first and the second series of locking teeth of a first one of the opposing arm members and the first one of the pair of projections, and a second one of the adjustment members being operable to provide an adjustable tension between the first and the second series of locking teeth of a second one of the opposing arm members and the second one of the pair of projections.

9. An apparatus for supporting a device, the apparatus comprising:

means for supporting the device including a body and a first pair of projections extending from the body to provide a support surface for the device, each of the projections of the first pair of projections having an end opposite the body;

means for adjustably engaging the device, the engaging means being operatively coupled to the ends of the projections of the first pair of projections of the supporting means;

means for securing the device to the supporting means and the engaging means; and means for coupling the apparatus to an adjustable extension assembly, wherein the coupling means includes an adapter section on the supporting means and a release plate disposed between the adapter section and the adjustable extension assembly for releasing the adapter section from the adjustable extension assembly, wherein the supporting means further includes a second pair of projections extending from the body;

wherein the first and second pairs of projections provide a generally planar support surface to receive the device, the projections of the first pair of projections being generally perpendicular to one another, and the projections of the second pair of projections being generally perpendicular to one another; and wherein the device is located at least partially between the body and the means for adjustably engaging the device when the device is supported by the apparatus, wherein the securing means comprises a plurality of clip members, each clip member having a main body clip and an adjustable clip slideably coupled to the main body clip.

10. The apparatus of claim 9, wherein the main body clip includes means for slideably connecting to the supporting means or the engaging means.

11. The apparatus of claim 9, wherein each of the projections of the first pair of projections has a first length, each of the projections of the second pair of projections has a second length, and the first length is not equal to the second length.

12. A holder system for supporting and positioning a user device about a workspace, the system comprising:

an extension arm assembly, including:
an adjustable arm member having a first end and a second end,
a first endcap coupled to the first end of the adjustable arm member, the first endcap being connectable to the workspace, and
a second endcap coupled to the second end of the adjustable arm member; and a holder unit, including:
an adapter coupled to the second endcap,
a support member operable to provide a support surface for the user device, the support member including a body and a pair of extensions extending from the body, each of the extensions having an end remote from the body, and
a pair of arm members, each arm member being individually pivotally coupled to the end of a respective one of the extensions of the support member, the pair of arm members being operable to individually adjustably size the holder unit to receive different user devices of different configurations without altering the support surfaces of the support-member; and a tilting device for adjustably positioning the user device, the tilting device being coupled between the second endcap of the extension arm assembly and the adapter of the holder unit;

wherein the pair of extensions is a first set of projections and the support member further comprises a second set of projections, the first and second sets of projections being arranged in an x-shaped pattern with the body to provide the support surface, and the pair of arm members are individually pivotally coupled to one of the sets of projections.

13. The holder system of claim 12, wherein the holder unit further comprises a plurality of connectors for securing the user device to the support member and the pair of arm members.

14. The holder system of claim 12, further comprising release means disposed between the adapter and the tilting device, the release means being operable to decouple the holder unit from the tilting device.

15. An apparatus for holding a device, the apparatus comprising:

a support having a front side, a rear side and a lower end, the front side of the support providing a support surface for the device, the support surface defining a support plane;

at least two arm members, each of the arm members having a first end and a second end, the first end being rotatably connected to the lower end of the support and pivotable about a pivot axis that is substantially orthogonal to the support plane, a position of the first end being fixed relative to the support other than rotation about the pivot axis, the second end being distal to the first end and not directly connected to the support, each of the at least two arm members being positionable in a plurality of rotational positions by rotating its first end about its pivot axis;

at least two connecting portions, each of the at least two connecting portions being adapted to engage a respective one of the at least two arm members between the first and second ends in an orientation in which each of the at least two connecting portions extends forwardly from each one of the at least two arm members and through the support plane; and at least one projection located at the lower end of the support and extending forwardly from the support through the support plane;

wherein each of the at least two arm members is configured to remain tangent to and/or rearward of the support plane in all of the plurality of rotational positions of each of the at least two arm members.

16. The apparatus of claim 15, wherein all of the plurality of rotational positions of the at least two arm members fall in a second plane, the second plane being substantially parallel with the support plane.

17. The apparatus of claim 15, wherein the support includes a plurality of body projections, each of the plurality of body projections being generally coplanar with the support plane.

18. The apparatus of claim 17, wherein the first end of each of the arm members is connected to one of the plurality of body projections.

19. The apparatus of claim 15, wherein rotation of the first ends of the at least two arm members changes an effective support width of the apparatus, the effective support width being measured in a direction approximately parallel with a line drawn between the first ends of the first and second arm members.

20. The apparatus of claim 15, wherein the at least two connecting portions can be adjusted to change an effective support depth of the apparatus, the effective support depth being measured in a direction substantially parallel with at least one of the pivot axes.

21. The apparatus of claim 15, wherein each of the at least two arm members includes a connector-receiving portion therealong for slideably receiving one of the at least two connecting portions.

22. The apparatus of claim 15, further comprising a supplemental support member extending along at least a portion of the lower end of the support member.

* * * * *